US 8,015,541 B1

(12) United States Patent
Srinivasan et al.

(10) Patent No.: US 8,015,541 B1
(45) Date of Patent: Sep. 6, 2011

(54) BUSINESS PROCESS TECHNOLOGY FOR THE ENTERPRISE

(75) Inventors: Venkatesan Srinivasan, Weston, MA (US); Mahantesh Kothiwale, Norwood, MA (US); Rummana Alam, Walpole, MA (US); Srinivasan Bharadwaj, Sharon, MA (US)

(73) Assignee: Rage Frameworks, Inc., Westwood, MA (US)

( * ) Notice: Subject to any disclaimer, the term of this patent is extended or adjusted under 35 U.S.C. 154(b) by 648 days.

(21) Appl. No.: 10/336,965

(22) Filed: Jan. 6, 2003

Related U.S. Application Data

(60) Provisional application No. 60/420,932, filed on Oct. 24, 2002.

(51) Int. Cl.
G06F 9/44 (2006.01)
(52) U.S. Cl. .......................... 717/104; 717/109; 717/125
(58) Field of Classification Search .................. 717/106, 717/104; 709/229, 246
See application file for complete search history.

(56) References Cited

U.S. PATENT DOCUMENTS

| | | | | |
|---|---|---|---|---|
| 5,611,043 A * | 3/1997 | Even et al. | ...................... | 714/38 |
| 6,249,905 B1 * | 6/2001 | Yoshida et al. | .............. | 717/100 |
| 6,308,168 B1 * | 10/2001 | Dovich et al. | ..................... | 707/1 |
| 6,601,233 B1 * | 7/2003 | Underwood | .................. | 717/102 |
| 6,615,258 B1 * | 9/2003 | Barry et al. | .................... | 709/223 |
| 6,697,824 B1 * | 2/2004 | Bowman-Amuah | .......... | 709/229 |
| 6,721,747 B2 * | 4/2004 | Lipkin | ............................. | 707/10 |
| 6,792,605 B1 * | 9/2004 | Roberts et al. | ................ | 719/313 |
| 6,810,429 B1 * | 10/2004 | Walsh et al. | .................. | 709/246 |
| 6,851,105 B1 * | 2/2005 | Coad et al. | ................... | 717/106 |
| 7,047,518 B2 * | 5/2006 | Little et al. | ..................... | 717/108 |
| 7,051,316 B2 * | 5/2006 | Charisius et al. | ............. | 717/103 |
| 7,219,328 B2 * | 5/2007 | Schloegel et al. | ............. | 717/104 |
| 7,272,819 B2 * | 9/2007 | Seto et al. | ...................... | 717/109 |
| 7,316,000 B2 * | 1/2008 | Poole et al. | ..................... | 717/104 |
| 7,673,282 B2 * | 3/2010 | Amaru et al. | .................. | 717/104 |
| 2002/0104071 A1 * | 8/2002 | Charisius et al. | ............. | 717/109 |
| 2003/0058277 A1 * | 3/2003 | Bowman-Amuah | .......... | 345/765 |
| 2004/0205726 A1 * | 10/2004 | Chedgey et al. | .............. | 717/125 |

OTHER PUBLICATIONS

IBM, "Instrumenting Enterprise Applications Using Tivoli GEM", Aug. 1999, 366 pages (262 pages extracted). [Online] [Retrieved at] <publib-b.boulder.ibm.com/Redbooks.nsf/RedbookAbstracts/sg245399.html>.*
Sun Microsystems, Inc., "Java 2 SE v1.3.1, API Specification", 1993-2001 (15 pages extracted). [Online] [Retrieved at] <java.sun.com/j2se/1.3/download.html>.*

(Continued)

Primary Examiner — Thuy Dao
(74) Attorney, Agent, or Firm — William L. Botjer

(57) ABSTRACT

A system, method and computer program that enables an application designer to automate the process of software development and develop business applications by modeling the constituent business process models is provided. After identifying the business requirements in terms of the underlying business processes, the same are modeled visually using the inter-relationships across processes. The modeling activity is accomplished by using the visual modeling environment in accordance with the preferred embodiment of the present invention, which, among other tools comprises a set of abstract business components. Each business process is viewed as a collection of business tasks. Each business task is modeled as an instance of an abstract business component. The instance acquires process-specific context with process-specific parameters input by the application designer. Such tasks are then connected together as required for the business process. A runtime execution module of the system executes these business processes at the user's request.

11 Claims, 30 Drawing Sheets

OTHER PUBLICATIONS

IBM, "Instrumenting Enterprise Applications Using Tivoli GEM", Aug. 1999 (pp. 131-172, 261-307, and 323-345). [Online] [Retrieved at] <www.redbooks.ibm.com/redbooks/pdfs/sg245399.pdf>.*

"Meta-models for building multi-agent systems", Gomez et al., Mar. 2002, pp. 37-41, <http://delivery.acm.org/10.1145/510000/508801/p37-gomez-sanz.pdf>.*

"A metamodeling approach to model transformation", Judson et al., Oct. 2003, pp. 326-327, <http://delivery.acm.org/10.1145/950000/949435/p326-judson.pdf>.*

"AI analysis patterns as UML meta-model constructs", Manjarres et al., Jul. 2002, pp. 237-238, <http://delivery.acm.org/10.1145/570000/568802/p237-manjarres.pdf>.*

* cited by examiner

BUSINESS PROCESS TECHNOLOGY FOR THE ENTERPRISE

PRIORITY CLAIM

U.S. Provisional Application 60/420,932 Filed Oct. 24 2002

BACKGROUND

The present invention relates to business process automation and management, and deals more particularly with the software development process for automation and management of business processes.

The Software Application Development Landscape

The last couple of decades have seen dramatic changes in the Application Development technology landscape. Application Development technologies have evolved considerably since the early days of computing. There have been major shifts in programming environments, architectures and methodologies as a result of the knowledge gained with each phase of evolution of the application development technologies. Simultaneously, there has been a pervasive impact of the Internet in terms of its demand for technologies and applications to meet the needs of electronic commerce and universal information access.

Changes in the Application Development Technology Landscape can be Organized Along Four Distinct themes.

The first major theme relates to the evolution of computing architecture. Computing architectures have evolved from a highly centralized computing environment (connected with non-intelligent display terminals) to client-server computing (with intelligent personal computers) to network centric architectures achieving greater scalability and flexibility.

The second major change relates to the increasing sophistication and structuring of programming environments. These programming environments have evolved from unstructured programming approaches to structured programming to object oriented approaches combined with the widespread adoption of Graphical User Interfaces (GUI).

The third major change has been the steady innovation in hardware technologies resulting in continual improvement in the price/performance ratio of computing hardware. Today, a low-cost server can be used to perform the function that would have required an expensive mainframe just 10 years ago.

The fourth major change is related to the increased adoption of disciplined methodologies aimed at reducing the software development lifecycle (SDLC) on the one hand and increasing the quality and predictability of software delivery on the other. Notable here is the emergence of the Capability Maturity Model (CMM) and the more recent emergence of Rational Unified Process (RUP) and the Unified Modeling Language (UML).

During the late 80s and early 90s, there was an unprecedented wave of adoption of client-server applications (such as Enterprise Resource Planning and Consumer Relationship Management) by a majority of large enterprises, often on a global scale. This adoption was based on a broad-based premise that this generation of applications was more flexible as compared to legacy applications and would therefore allow enterprises much greater flexibility in conducting their businesses.

As client-server applications were being deployed across enterprises, the shortcomings of the client-server architecture started surfacing. It was found that the client-server applications yielded heavy, unwieldy clients and the server side technologies were generally found wanting in terms of performance and scalability. While many server side technology vendors, both hardware and software, have responded to these concerns adequately, the relatively high maintenance associated with heavy client applications led to the recognition that a superior approach may be to evolve thinner clients and create additional architectural tiers to allow greater scalability with reduced maintenance.

More recently, in the last couple of years, the introduction of a network-centric computing paradigm with the now ubiquitous 'browser' and the promise of platform neutral computing with Java™ (and now C#) is leading to a newer generation of applications and technologies, e.g. mySAP™.

Impact of the Internet on Application Development

Quite apart from the impact that the commercialization of the Internet is having on Application Development technologies and applications, it is believed that the Internet has had the following three types of impacts on businesses in general—providing greater transparency in all aspects of commerce, providing the impetus for corporations to streamline internal processes and acting as a catalyst for the accelerated development of newer technologies to meet the needs of Internet commerce.

Clearly, the Internet has had a profound impact on every aspect of business and personal life. Notwithstanding the irrational exuberance that accompanied the first phase of widespread Internet adoption, it is believed that the Internet is a disruptive innovation that is causing profound changes in the way commerce is conducted.

The Software Development Lifecycle and Application Development

Software development has evolved from an idiosyncratic art to an engineering discipline. The days of learning the art from a master craftsman have given way to structure, standards and the disciplines akin to engineering science. A conventional SDLC is illustrated in FIG. 1 and is described below.

An SDLC consists of many stages as an idea gets converted into a software application. At each stage, output from the previous stage is translated to serve the purpose and audience of the current stage. These translations are necessary so that ultimately a translation capable of being acted on by a computer can be produced. With each successive translation, there is an obvious need to preserve full information and knowledge from the previous stage. At a minimum, this need creates a significant amount of overhead and also slows down the process.

Over the years, there has been a substantial amount of effort in making the SDLC effective, fast and predictable. Such efforts can be classified into two major categories. In the first category are the methodological approaches aimed at improving the communication and translation between the various stages of the lifecycle by standardizing them and at eliminating the redundancies across Application Development efforts. In the second category, automation approaches aimed at automating one or more stages of the SDLC are included.

The focus of the methodological approaches has been to evolve the SDLC to an engineering science to increase the predictability and reliability of software development, in general. Earlier methodologies prescribed a waterfall approach to software development, which effectively called for detailing all the requirements up front in order to create a stationery target for the developers. However, there has been overwhelming evidence that static, waterfall approach to software development does not yield successful results. More details on the methodological approaches are provided in 'Decline and Fall of the American Programmer', by Edward Yourdon, Prentice Hall, 1992.

The current belief is that an iterative and an object oriented approach for design and development holds the promise of yielding a more effective approach to Application Development.

As competing methodologies evolved with their proprietary models and deliverables, the Unified Modeling Language (UML) has gained momentum as a common modeling language, separate and independent of various proprietary methodologies. The purpose behind UML is to evolve a common modeling language without constraining the development of unique methodological approaches. More details on UML are provided in UML 1.4, Object Management Group, Needham, Mass.

Automation efforts largely began with automated code generation and testing tools. There are several effective automated testing tools available today. While these tools can reduce the physical testing effort significantly, they are still predicated on the creation of test cases, which, in itself is a tedious and a time consuming task. The focus of testing tools is on reducing the effort required for testing, especially for subsequent versions and releases, and not on eliminating the need for testing. Tools that attempt to automate the creation of test cases from requirements models are being developed nowadays. These sets of tools reduce the effort required to create the test cases.

There is a long history of automated code generation efforts with a variety of Computer Aided Systems Engineering (CASE) tools emerging in the 80s. These tools, however, did not achieve widespread adoption as they were based on relatively weak conceptual models. More recently, there has been a revival in such tools in the context of a more robust methodological basis (for example, the UML). Recent efforts have focused on encapsulating and implementing UML compatible tools. Some examples of such efforts have resulted in solutions such as Togethersoft®, Rational Rose™ and Neuvis.

Current Issues in Application Development

While today's Application Development technologies are clearly a significant improvement over technologies 5 to 10 years ago, several fundamental issues such as time to market, the lack of a process-centric approach, the need to cope with the rapid changes in technology environments and standards, the availability of skilled resources, and others still present significant challenges.

Time to Market

The time to market is probably the most vexing of all the issues. The speed with which applications are built has always been a thorny issue in computing in general. Multi-year Application Development efforts were not uncommon in large enterprises. However, such durations have become unacceptable as they put organizations at a serious disadvantage.

Businesses have become much more dynamic, global and require the ability to be mobile and conduct business transactions anywhere and anytime. Such demands have accentuated the time to market issue even more in the last several years. The commonly held view among industry analysts is that companies must be able to create and evolve business processes and applications in response to rapid changes in the industry or customer demand in order to thrive and/or survive. Traditional development methodologies cannot produce applications or their modifications fast enough.

Thus, there is a need for Application Development cycles not only to be rapid but also flexible so that changes could be made equally rapidly.

Function-Centric Versus Process-Centric Focus

There is another major issue that Application Development technologies have not yet addressed. Most approaches to Application Development are functionally oriented. Process, often thought of as workflow, is mistakenly viewed as distinct and separate from functions or tasks. This is a major weakness in the current approaches.

Businesses can be viewed simply as a collection of business processes. A business process is a set of interrelated tasks that are performed in some order by a combination of humans and machines. A process can typically involve one or more functions. A business's objective is to maintain business processes at optimal levels. Most Application Development technologies do not provide an environment that promotes a process centric development strategy. They either tend to be user-centric or function-centric. This invariably leads to an inability to deal with business process changes and probably is the single greatest source of inflexibility in current tools.

Resource Availability

The third major issue with Application Development is the availability of trained resources. There is a general shortage of adequately trained resources and this greatly contributes to the delays and failures in Application Development projects commonly experienced by organizations. Compounding this issue is the rapid obsolescence of skill sets with newer technologies. Just a few years ago, C++ programmers were sought after and now they have to retool themselves to be Java™ programmers. The rate at which new skills get absorbed to create a critical mass of appropriate resources is much slower than the demand for such resources.

Even though the subsequent slow down in the U.S. economy and the slower proliferation of e-commerce than originally envisioned has alleviated the resource shortage, it is still acute and an endemic issue as technology evolves.

Heterogeneity and Rate of Change in Technology Environments

In the last two decades, we have seen a dramatic increase in the rate at which new products and technologies have been introduced. The commercialization of the Internet has also served as an added stimulus in this regard. The heterogeneity in the technology infrastructure is often a major issue in most corporations and often influences their purchasing decision in favor of one technology over another. A heterogeneous infrastructure introduces additional overhead and yet, the organization has to balance a unified infrastructure with availability of the desired functionality on that infrastructure.

In the 80s, organizations were faced with the task of having to choose client and server operating systems. Organizations were faced with the choice of choosing a platform that will survive and keep pace with their needs. Today, that market seems somewhat less fragmented with Windows™ holding a very large market share in the client side, and a mix of Windows™ and Unix™ on the server side. Similar choices have to be made on the hardware side.

The issues today seem to have shifted to Application Development technologies. There are competing development standards (e.g., J2EE™, .NET), messaging vendors, and databases to choose from. There are also the constantly evolving architectural standards, issues of flexibility and integration with legacy applications. Technology organizations have to constantly evolve a migration strategy maintaining a balance between what they already have and the new developments with future benefits.

RELATED PATENTS AND PRODUCTS

Various patents and products exist that enable users to rapidly develop software applications. Some of these solutions are discussed below with reference to the corresponding patent or product.

U.S. Pat. No. 6,405,364, titled "Building Techniques in a Development Architecture Framework", granted to Accenture LLP, Palo Alto Calif., provides a system for building systems in a development architecture framework. The patent is directed to both a system to be built and an implementation strategy to fulfill system requirements. The system is built according to the implementation strategy. Performance of the system is improved by using information relating to a previous system.

U.S. Pat. No. 6,237,135, titled "Development System with Visual Design Tools for Creating and Maintaining Java Beans Components", granted to Borland Software Corporation, Scotts Valley, Calif., provides a component-based Rapid Application Development (RAD) system that allows a developer to create Java Beans compatible components rapidly. The system uses design patterns (that specify how components created must appear in source code form) and inputs from the developer (to create the component by specifying properties for the component) to generate the source code. The system also assists the developer in creating and modifying components using a GUI.

Xyrian™, an Application Development solution offered by Remote Apps Ltd., is a code framework that has horizontal components that can be invoked and/or integrated in the code a developer is developing. The framework also enables a developer to develop J2EE™ compatible applications through the implementation of the J2EE™ standard blueprints.

All of the abovementioned patents or products envision that software applications would be developed by coding. They either require the application developer to write the code or they generate the code in a specific language(s) using models that are created by the application developer. The code is then compiled into a machine executable form. Thus, in the end, the software application is a set of executables in a machine code. None of these patents or products envisions applications merely existing as models without the generation of code. Since, the end product is the code in a programming language, these environments still require substantial amounts of programming skills and suffer from the technology obsolescence issues identified earlier. Moreover, these solutions do not provide a holistic business process centric framework that can facilitate business process centric Application Development. Without such a framework, applications will continue to be inflexible and require customization to meet user specific requirements.

Additional References to the Aforesaid:
Business Process Modeling with UML, Hans-Erik Eriksson and Magnus Penker, Wiley, 2000.
Extreme Programming Explained, Kent Beck, Addison-Wesley, 2000.

SUMMARY

The present invention is directed to a system, method and computer program that satisfies the need for an application development framework that automates the process of software development instead of automating the process of coding.

An object of the present invention is to provide a system, method and computer program that enables an application designer to develop business applications by modeling relevant business processes.

Still another object of the present invention is to provide a system, method and computer program that enables an application designer to develop business applications with reduced software development life cycles.

A further object of the present invention is to provide a system, method and computer program that reduces an application development activity to a pure modeling exercise.

Another object of the present invention is to provide a system, method and computer program that allows business process changes to be made rapidly by merely changing the relevant business process models without doing any re-coding or testing as in a conventional Software Development Life Cycle.

Another object of the present invention is to provide a system, method and computer program that is business friendly and reduces and/or eliminates the need for an application designer to have expertise in at least one formal programming language.

To attain the above-mentioned objectives, the present invention provides a system, method and computer program that provides a complete application development environment comprising a visual modeling environment enabling an application designer to design and model business applications, a set of pre-built components and application frameworks, a functionality enabling the integration of external components and/or programs and a business process engine capable of executing the business processes and/or the application modeled by the application designer. The visual modeling environment allows the application designer to develop an application's business process models in a flowchart like manner using either pre-built or customized components. These components are highly abstract objects that are built to perform a specific function in a generic manner. An application designer creates a business process by modeling the process flow using the visual modeling environment including selecting appropriate components for the tasks and logically connecting them with each other. Application frameworks are pre-modeled applications that may be configured by the application designer to suit specific requirements. The business process engine executes the business process models i.e. runs the applications developed using the visual modeling environment.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

1. Introduction

The present invention provides for a method, system and computer program to automate the process of software development. As opposed to the current set of application development technologies that focus on automating the process of coding through proprietary conceptual frameworks, the current invention provides a method, system and computer program to reduce the Application Development activity to a modeling exercise and relies on abstract high level components to eliminate coding altogether.

Figure 1:
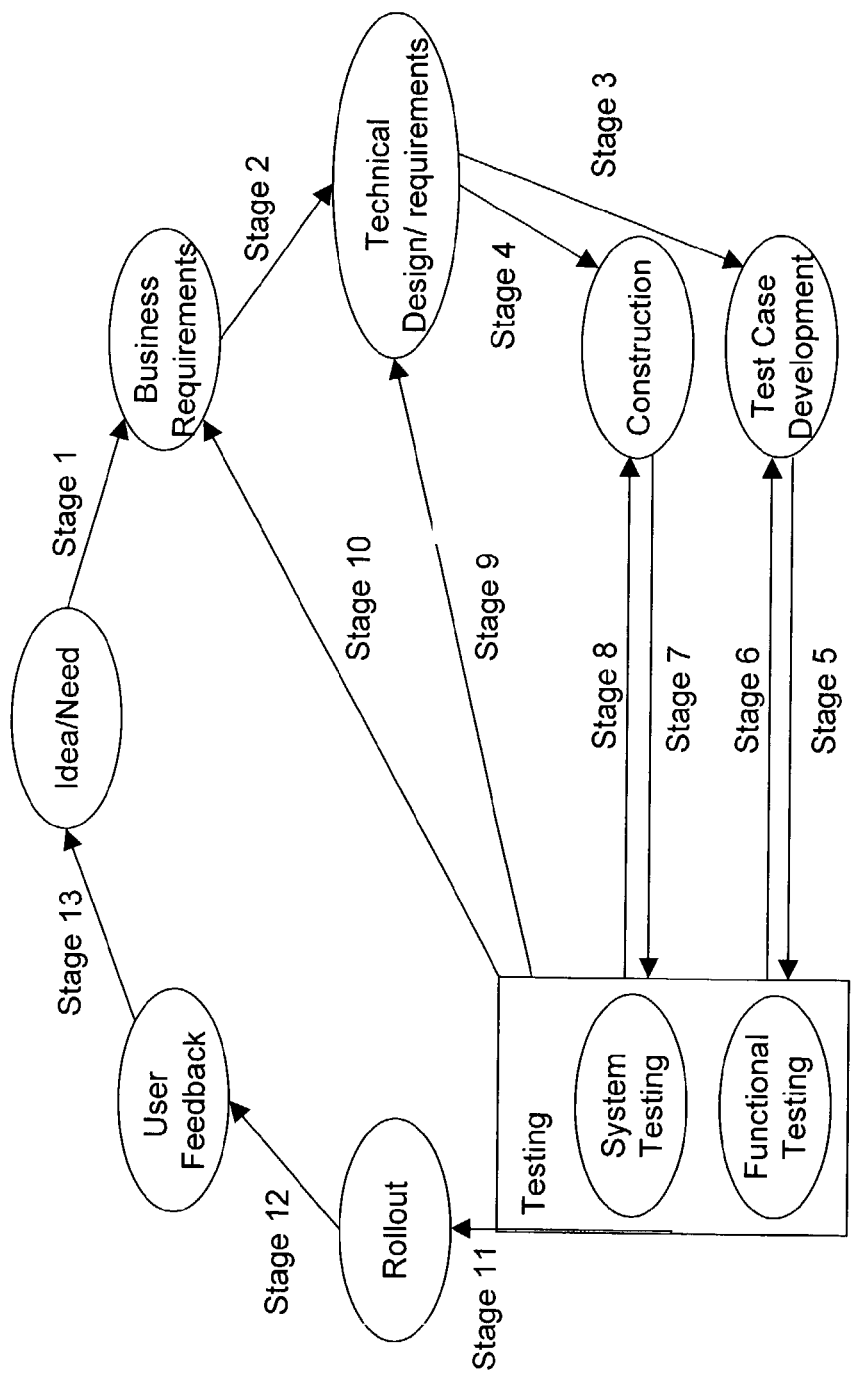
FIG. 1 illustrates a typical Software Development Life Cycle (SDLC)
Figure 2:
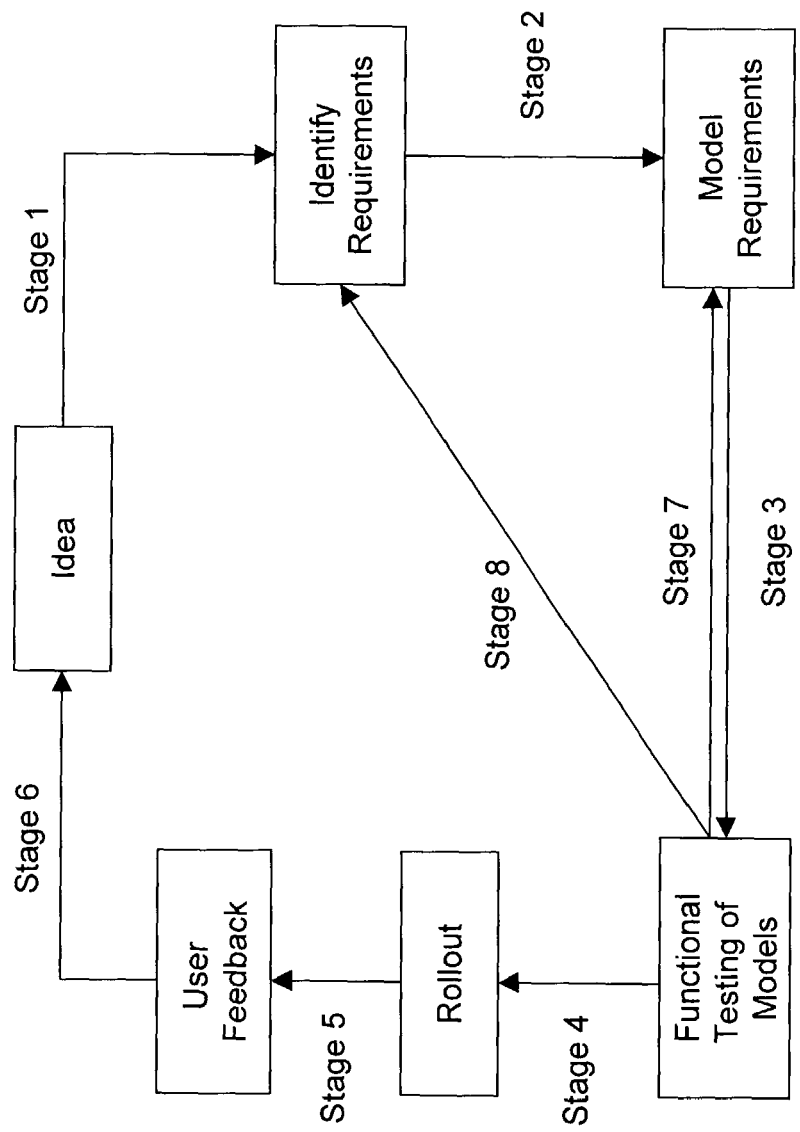
FIG. 2 illustrates the Software Development LifeCycle in accordance with the preferred embodiment of the present invention.

Referring primarily to FIG. 2, the software development lifecycle in accordance with the preferred embodiment of the present invention is hereinafter described in detail. In this lifecycle, the first stage involves the translation of an idea into business requirements. The business requirements are documented in terms of the business processes that need to be supported by the application. The second stage involves visual modeling of these requirements using the preferred embodiment of the present invention. In the third stage, the models are tested for their functional validity. Once the models have been validated functionally, the application is ready to be released. The fourth stage is when the application is released and the fifth stage involves obtaining feedback from the users. Stage six reflects that the feedback from the users typically results in generation of a new idea; after stage six, the software development lifecycle starts all over again. Stages seven and eight are feedback stages where functional testing of the models may result in revisions to requirements and/or models.

Figure 3:
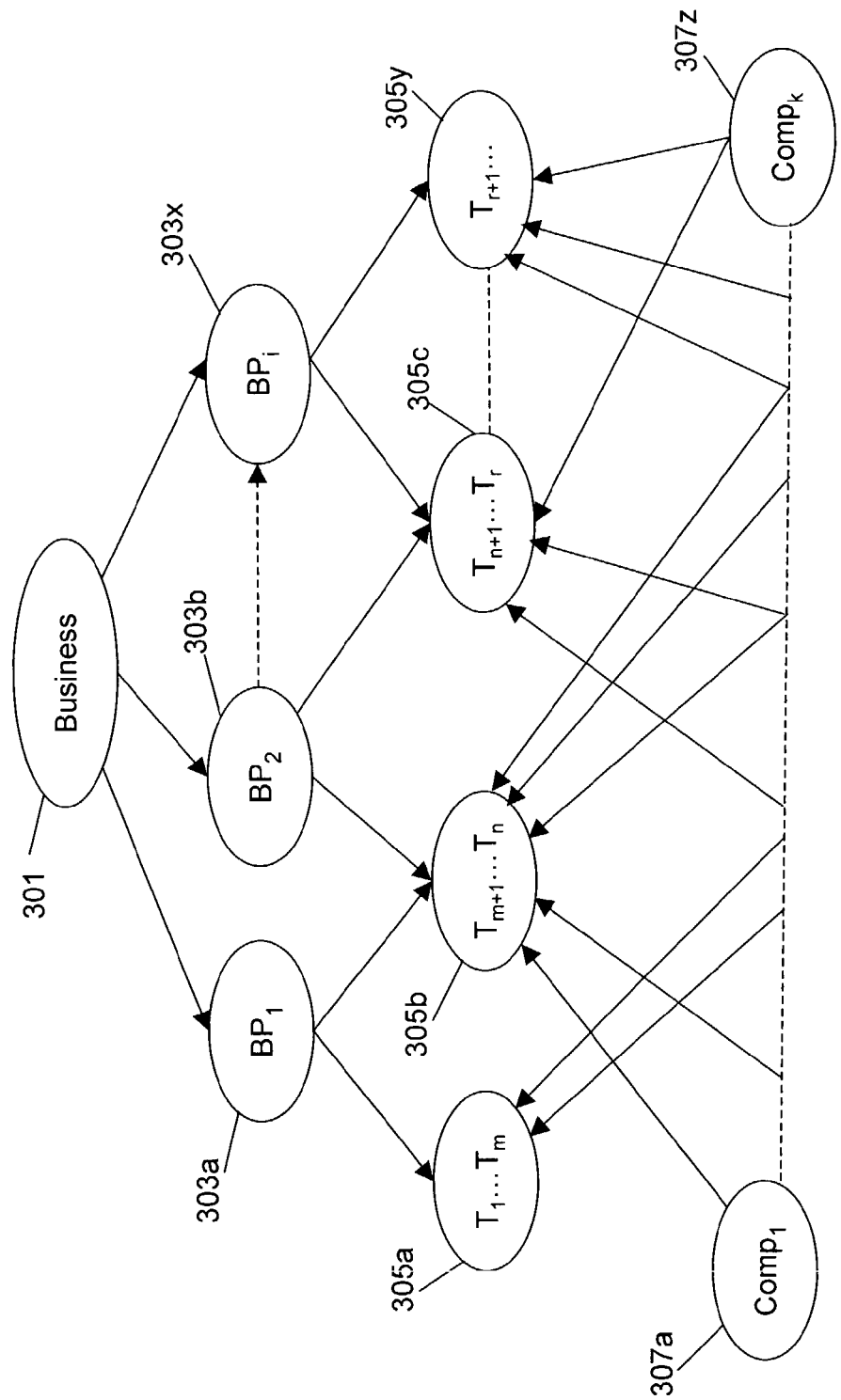
FIG. 3 shows a multi-echelon systemic view of a typical business.

In accordance with the preferred embodiment of the present invention, a business or a business problem is broken down into its constituent business processes. Referring now primarily to FIG. 3, such a multi-echelon systematic view of a business is hereinafter described in detail. A Business 301 comprises business processes 303a-x. As shown, business process 303b may initiate another business process 303x; business process 303x may be viewed as a sub-process of business process 303b. Each business process 303a-x is a collection of business tasks. For example, business process 303a comprises a set of tasks 305a and another set of tasks 305b wherein set of tasks 305a further comprises tasks $T_1$ to $T_m$ and set of tasks 305b further comprises tasks $T_{m+1}$ to $T_n$. These tasks are arranged in a logical order to model the business process. The tasks, when carried out in the defined logical order, would execute the business process. Multiple arrows into a set of tasks (coming from the top in the figure), for example 305b, illustrate that the same set of tasks is being executed in more than one business process (303a and 303b). Finally, each task, (for example T1), is an instance of one of abstract business components 307a-z. Instances of components 307a-z, when provided with business process specific properties become business tasks. Different instances of the same component will result in different business tasks appropriate for the process they are being used in, even though they are instances of the same abstract business component. For example, two tasks that display User Interface screens are both instances of the User Interface component and yet, would be displaying two different screens and would be used in two separate processes or the same process. The difference between the two tasks lies in the task-specific properties specified as parameters to the instance of the User Interface component used in respective tasks.

Once business requirements are identified in terms of the underlying business processes, they are modeled using the preferred embodiment of the present invention, including the inter-relationships across processes. The modeling activity is accomplished by using the visual modeling environment in accordance with the preferred embodiment of the present invention, which, among other tools comprises a set of abstract business components. Each business process is viewed as a collection of business tasks. Each business task is modeled as an instance of an abstract business component. The instance acquires process-specific context with process-specific parameters input by the application designer. Such tasks are then connected together as required for the business process. The entire set of business process models for an application, including their inter-relationships, is referred to as the application domain.

There are many different scenarios that an application designer could adopt when approaching application modeling. Here are a few sample scenarios:

Scenario A
- Start with the application domain first and identify as many high level processes as possible
- Model the processes and their tasks including providing process-specific information for each task and data requirements
- Design an appropriate data model
- Revise processes, as appropriate Scenario B
- Start with data requirements first and design the data model
- Model the application's User Interface
- Model non-User Interface processes
- Review and modify, as appropriate Scenario C
- Start with a User Interface storyboard
- Complete User Interface models
- Model any non-User Interface processes
- Complete the data model
- Review and modify, as appropriate Scenario A is a top-down approach to modeling an application. Here the application designer starts by modeling the application's domain and then proceeds to model the details. A data model is a structural representation of the data that would be collected in any application and stored permanently. Scenarios B and C, on the other hand, start with a specific aspect of the application (for example, the application's User Interface storyboard in scenario C) and proceed to other aspects later. A User Interface storyboard is a map of all the user interface screens and their relationship with each other.

The actual approach followed would be a function of the application designer's prior experience and expertise. While the above scenarios have been shown to be sequential, the process is likely to be iterative between the various steps. Further, the abovementioned scenarios are not mutually exclusive; an application designer may follow a combination of the abovementioned scenarios. It is also possible to conceive of many more scenarios.

The modeling environment provides a business friendly point-and-click facility for the application designer to model a business process and the business tasks. The environment also provides an initial set of abstract components that represent commonly required functionality in a software application. An experienced application designer may add additional application or context specific components by merely modeling such components as processes.

Once the models are developed, the next stage involves testing the logical accuracy and efficiency of the models. Upon having validated the models for logical accuracy and efficient performance, the application is ready to be released.

In the software development lifecycle in accordance to the present invention, as described in FIG. 2, the number of stages in the cycle are significantly less with the less value added steps largely eliminated. Stages that do not add any significant value to the final application are largely eliminated. Stages that arise purely because of coding are also eliminated. The reduction in the number of stages also results in a reduction in the number of feedback stages, for example, stage 7, resulting in a significantly simplified cycle.

2. An Example Business Application

The example business application described here is an application to provide a structured form of corporate financial information filed with the U.S. Securities and Exchange Commission (SEC).

Figure 4:
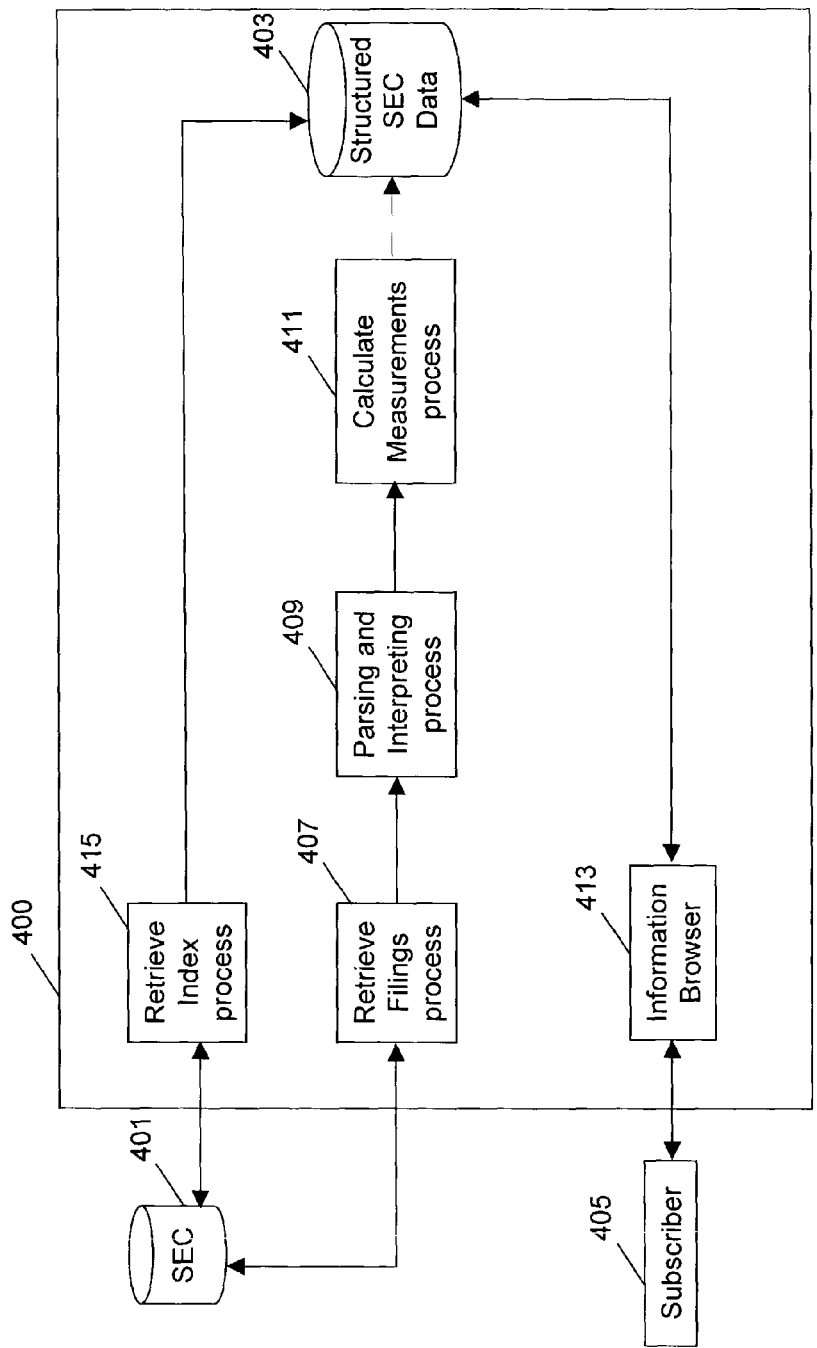
FIG. 4 shows a sample business application for automating the retrieval of corporate financial filings from the U.S. Securities and Exchange Commission (SEC)

Referring now primarily to FIG. 4, the interrelationship between the highest-level business processes in the example business application domain is hereinafter described in detail. The figure also illustrates the interaction of the business application with external entities including other applications and users. A Business application 400 automates the retrieval of corporate filings with SEC 401. Further, it transforms the filings into structured SEC data 403 for interested subscribers 405. Such a business application would involve automation of many business processes like the Retrieve Index process, the Retrieve Filings process, the Parsing and Interpreting process and the Calculate Measurements process. Retrieve Index process 415 retrieves the index of filings from SEC 401, Retrieve Filings process 407 retrieves the filings based on the information provided in the index, Parsing and Interpreting process 409 parses and interprets the retrieved filings to obtain the required information while Calculate Measurements process 411 calculates measurements of interest to interested subscribers 405. Subscribers 405 may browse the structured information including the calculated measurements using an Information Browser 413.

Figure 5:
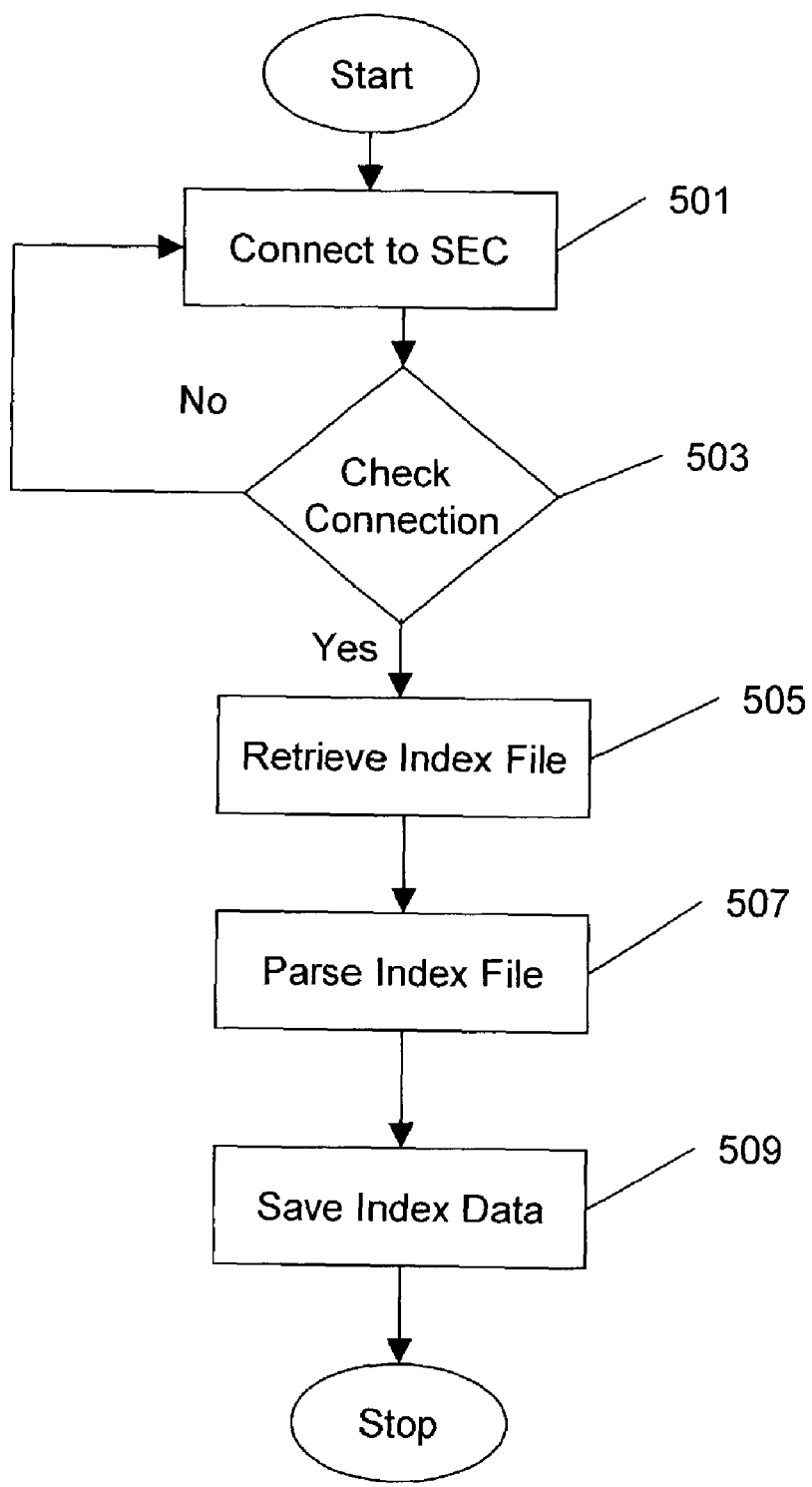
FIG. 5 shows a sample business process that shows the steps performed by the process that retrieves data from SEC.

Referring now primarily to FIG. 5, the steps performed by Retrieve Index process 415 are hereinafter described in detail. The process starts at step 501 by connecting to the U.S. SEC site where filings are available for download. This step is performed by 'Connect to SEC' task. At step 503, 'Check Connection' task checks whether the connection has been established. Once connected, at step 505 the index file for the appropriate date is retrieved. This step is performed by 'Retrieve Index File' task. If the file is not found, an error message is generated. If the file is found, 'Parse Index File' task is initiated at step 507. 'Parse Index File' task interprets the daily index file and retrieves the information pertaining to the identity of the filers and the corresponding filing document names. At step 509, the process initiates 'Save Index Data' task that saves the extracted information in a database for subsequent processing.

Most of the tasks mentioned above are facilitated by the abstract component Connector Factory. The process also makes use of two other abstract components: Database Access component and the Business Rule component. 'Connect to SEC' task is an instance of the Connector Factory component. Task specific properties for 'Connect to SEC' task, for example, the Universal Resource Locator (URL) information is provided to an instance of the Connector Factory component to make it process specific. Similarly, 'Retrieve Index File' task is also an instance of the Connector Factory component. The Connector Factory component allows for actions such as retrieving a file across a network. In the case of 'Retrieve Index File' task, to make the Connector Factory instance process specific, the application designer needs to provide the component with the properties such as the file name and its location identifier (URL). 'Parse Index' task is also an instance of the Connector Factory component and interprets the retrieved index file using the structural properties of the index file. The structural properties of the index file are specified as properties to the instance of the Connector Factory component. The final task, 'Save Index Data' task is an instance of the Database Access component. Here, the application designer provides mapping information that maps the data in the process memory to tables and fields in the database.

Figure 6:
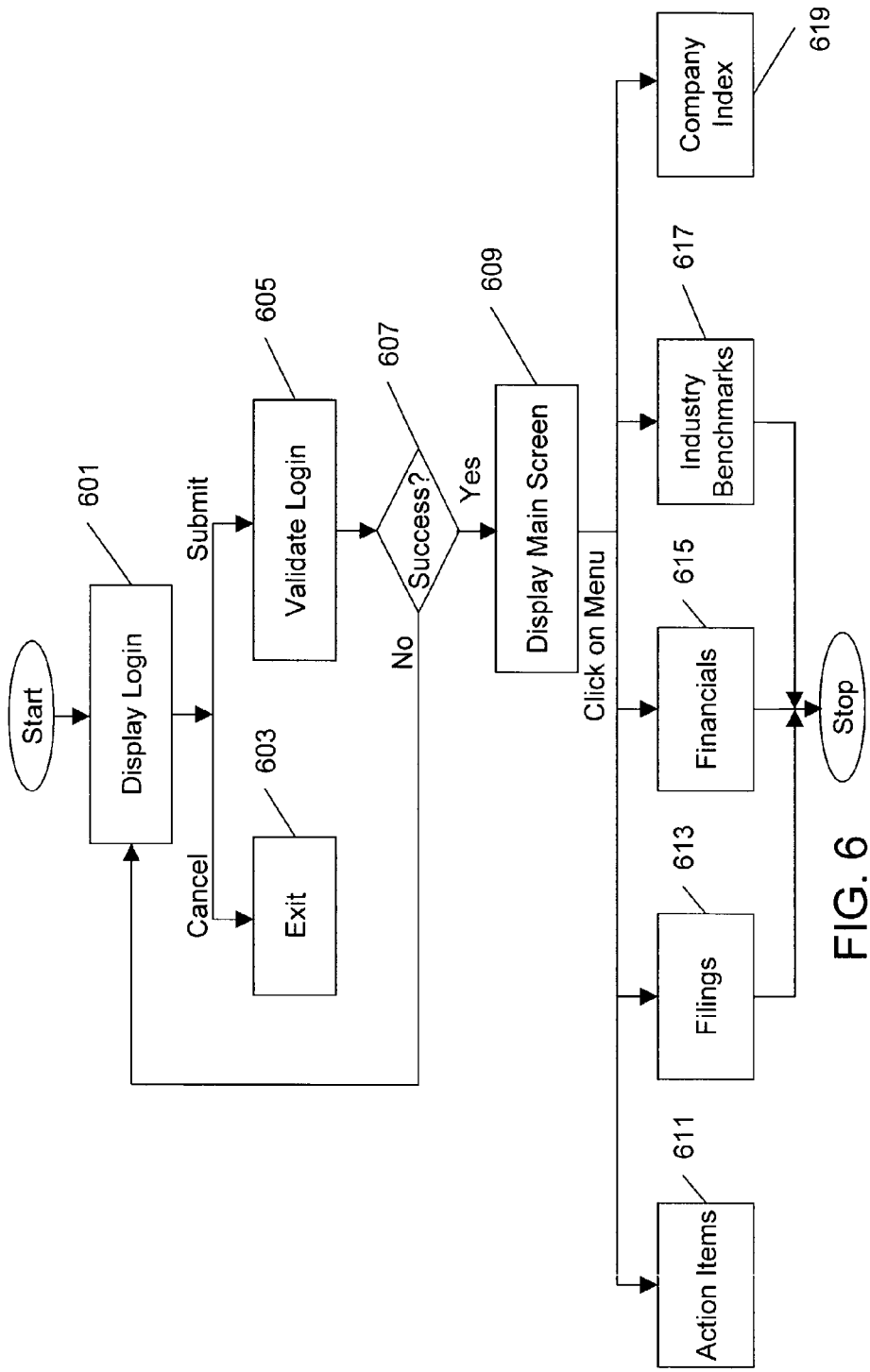
FIG. 6 shows a sample business (login) process of an example business application.

Referring now primarily to FIG. 6, an example business process, Information Browser 413, that presents structured information to the subscribers is hereinafter described in detail. The process starts with initiating the 'Display Login' task at step 601. The 'Display Login' task displays a login screen to a user. The login screen prompts the user to provide a user name and a password. Thereafter, the user may either choose to 'Cancel' or 'Submit' the request. If the user opts to 'Cancel', 'Exit' task is initiated at step 603. If the user opts to 'Submit', the 'Validate Login' task is initiated at step 605. The 'Validate Login' task at step 605 matches the user name and password with the one stored in the database. If the user name and the password match, the 'Validate Login' task at step 605 outputs TRUE, else FALSE. This output is stored as part of the process memory and is accessible to all the succeeding tasks in the process. The 'Success?' task checks the output of the Validate Login task. If FALSE is detected, it re-initiates the 'Display Login' task. If the 'Success?' task at step 607 detects TRUE, it initiates the 'Display Main Screen' task. The 'Display Main Screen' task at step 609 shows the main screen to the user. This main screen has a menu with five options namely 'Action Items', 'Filings', 'Financials', 'Industry Benchmarks' and 'Company Index'. These five options correspond to five processes; these five processes are effectively sub-processes since they are being initiated by this process. Depending on the option the user chooses, the Information Browser 413 initiates one of five sub-processes 611, 613, 615, 617 or 619.

Information Browser 413 described above contains a mix of tasks and sub-processes. 'Display Login' task is an instance of the User Interface component and contains all the properties necessary for displaying the login screen to the user. 'Validate Login' task is an instance of the Database Access component. 'Exit' task is an instance of the Process End component and denotes the end of the process. 'Success?' task is an instance of the Decision component. 'Display Main Screen' task is an instance of the User Interface component. Each of the sub-processes, Action Items 611, Filings 613, Financials 615, Industry Benchmarks 617 and Company Index 619 are instances of the Process component and represent collections of business tasks similar to Information Browser 413. Each task within these processes is, of course, in turn an instance of an abstract component.

3. Overview of the Preferred Embodiment

Figure 7:
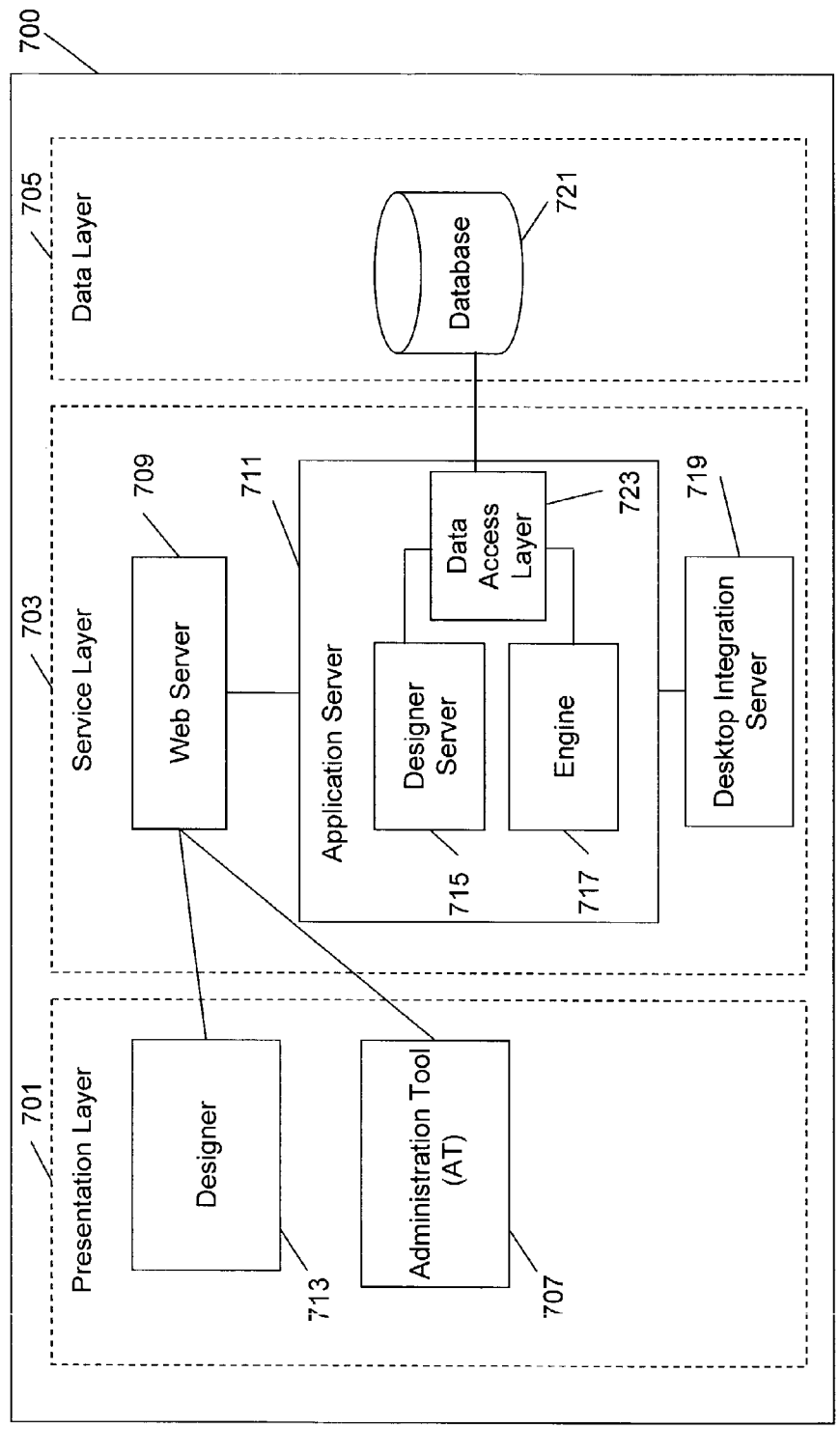
FIG. 7 illustrates a network diagram of the system in accordance with the preferred embodiment of the present invention.

Referring now primarily to FIG. 7, a network diagram of the system in accordance with the preferred embodiment of the present invention is hereinafter described in detail. System 700 allows for development and deployment of business processes wherein each business process is viewed as a collection of tasks. The network architecture supports three layers—a Presentation Layer 701, a Service Layer 703 and a Data Layer 705.

Presentation Layer 701 comprises User Interfaces. These User Interfaces comprise a Designer 713 and an Administration Tool (AT) 707. Designer 713 is a Java application used to create, debug and validate the processes. Designer 713 provides a visual modeling environment that allows the application designer to define, build and deploy processes and applications. An application designer creates business applications by modeling the application's business processes in a flowchart like manner. Modification of an application is also done using Designer 713 by modifying the visual flow diagrams that constitute, the relevant business processes. AT 707 lets the administrator perform administrative functions such as security management, log files maintenance, reporting and monitoring system activity.

Service Layer 703 comprises a Web Server 709, an Application Server 711 and a Desktop Integration Server 719.

Web Server 709 runs a Controller Servlet compliant with industry standard web servers. This Controller Servlet is a program that facilitates connection of Designer 713 and AT 707 to Application Server 711. Designer 713 and AT 707 interact with Web Server 709 through HTTP(S) (Secure Hypertext Transfer Protocol). In the preferred embodiment of the present invention, Web Server 709 can handle both HTML and XML requests from User Interfaces of System 700.

Application Server 711 comprises three parts—a Designer Server 715, an Engine 717 and a Data Access Layer 723. Designer Server 715 facilitates User Interfaces of Presentation Layer 701. Engine 717 is the runtime execution module of System 700. Engine 717 serves (i.e. executes or interprets) the requests generated by an application designer while developing and maintaining application models and serves the requests generated by a user while using an application. Engine 717 also houses the XML versions of the process and the task models created using Designer 713.

Data Access Layer 723 acts as a gateway to a Database 721. Data Access Layer 723 provides a set of standard interfaces, which are implemented by various Java beans. Data Access Layer 723 is used when either Engine 717 or Designer Server 715 needs to access Database 721. Data Access Layer 723 provides two important sets of functions: capture statistics related to database access and associate process triggers with database changes. Statistics related to database access could be the query time, elapsed time and execution time. These statistics assist in database performance optimization. Frequently, the application designer will desire to associate business processes as a function of changes to data in the database. For example, a user using Designer 713 may specify that whenever a new customer is created in the application, a New Customer process be executed. Such associations may be easily modeled because of Data Access Layer 723.

The application designer interacts with Designer 713 to create application models and stores the validated models in Database 721. The administrator interacts with AT 707 to administer System 700 and applications created using System 700. The user interacts with the applications modeled using Designer 713. All these interactions generate requests that are serviced by Engine 717.

Desktop Integration Server 719 provides services by integrating Engine 717 with word processors, spreadsheets, presentations, mail servers, fax servers and printers. In the preferred embodiment, integration with Microsoft's suite of products such as Microsoft Word, Excel, PowerPoint, and FAX and SMTP-compliant mail servers (Simple Mail Transfer Protocol) is provided. A Visual Basic Service runs on Desktop Integration Server 719. Desktop Integration Server 719 communicates with Engine 717 using an internal queue and provides the services identified above.

Data Layer 705 comprises Database 721. Database 721 stores all the application models, i.e., the processes, the tasks and their properties. Database 721 is a meta-database. Access to Database 721 through Data Access Layer 723 is provided through a connection pool using the Java Database Connectivity (JDBC) protocol.

4. Details of the Preferred Embodiment 4.1 Designer

Figure 8:
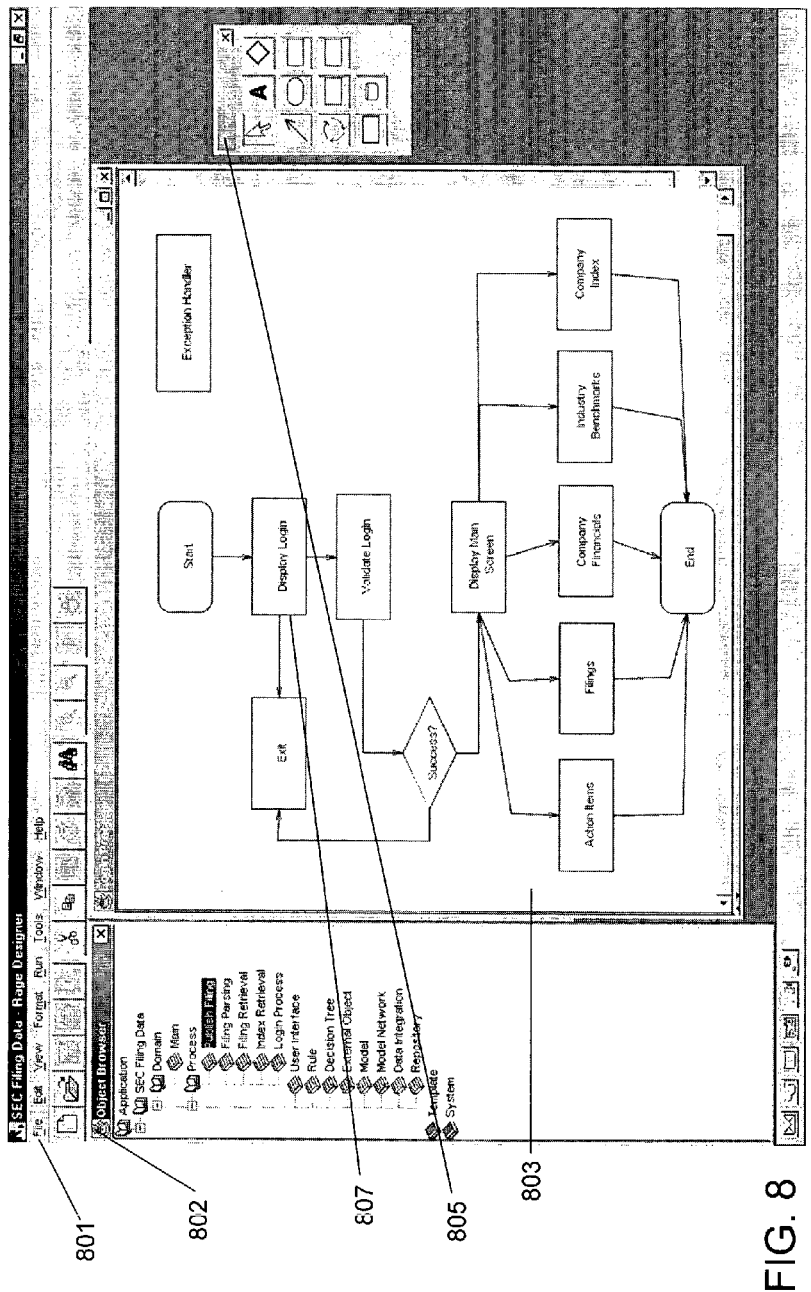
FIG. 8 shows the Designer screen the way it would appear during a typical application/process modeling session.

Designer 713 comprises an integrated set of modeling tools and abstract components that together allow the application designer(s) to model and validate all aspects of the application visually. Referring now primarily to FIG. 8, a GUI for the main screen of Designer 713 is hereinafter described in detail. The illustration shows the GUI the way it would appear during a typical application/process modeling session. The figure shows a Designer Menu System 801, an Object Browser 802 and a Process Palette 805. Designer Menu System 801 provides a number of menu options to the application designer to create applications, processes, and tasks and to validate them. Object Browser 802 is another way for the application designer to navigate through the applications and models created in Designer 713 and/or to engage in modeling. Designer 713 allows the application designer to create multiple applications, reuse whole or part of any application in another application, create applications and/or tasks as templates, and designate certain processes and/or tasks to be at the system level, forcing a higher level of security and access control.

FIG. 8 also illustrates a sample application modeling session in which the application designer has chosen to approach modeling from a top-down perspective, i.e. Scenario A. Object Browser 802 shows an application titled, "SEC Filing Data" for which five processes have been modeled. In a Business Process workspace 803, the application designer visually models the business process by dragging and dropping instances of the required components from Process Palette 805. Business Process workspace 803 is displaying Information Browser 413. The application designer may also click on the appropriate component name in Object Browser 802 and use the right-click property as an alternative to the drag-and-drop process.

A process in accordance with the preferred embodiment comprises multiple tasks that are connected to each other. Every task performs a step in the overall process. A task is an instance of a component with business process specific runtime properties, i.e. a task is a business object that provides services specific to a business process or collection of processes. A component is a highly abstract object, which represents a function that is typically required in an application and provides generic services that can be made process-specific by providing process-specific properties.

While creating a business process, the application designer selects these pre-built components according to the requirement of the business process. The application designer thereafter creates tasks using the components by specifying run-time properties specific to the business process. Using Designer 713, the application designer drags and drops these tasks and then interconnects them to model the entire business process. After connecting the tasks, the application designer specifies process-level properties such as when to run the task. These are called Process Triggers and they could be ad hoc, periodic or event based. An ad hoc scheduling is used, if the user needs to run a process for a defined set of date-time, which may include the current time as well. The application designer may choose periodic scheduling, when, for instance, a user wants a process to be executed every night, except on holidays. Event Triggers are attached to database activity. The user can have processes triggered based on database activities such as insert, update and delete at table as well as column level. Thus, the application designer creates the entire business process in a flowchart-like manner by connecting the pre-built components. Hence, neither coding nor programming needs to be done in order to create a business process. Therefore, anyone with none or very little coding and/or programming knowledge may create applications that model highly complex and efficient business processes. This would save a lot of expenses that an enterprise would have incurred otherwise in hiring or employing programming experts.

Creating a new process from an existing process is even simpler. The application designer may use an existing process and make a copy of its template by using "save as" feature. The copy is named and the tasks are changed according to the requirements of the new process. The properties related to the new process are supplied in the tasks. The tasks are connected with each other to reflect the process flow logic. After connecting the tasks in a logical flow, process level properties are specified.

Process Palette 805 contains a representation of all the available components in the form of icons. While creating a business task using a business component, the application designer may either re-use an existing task (modeled previously) or create a new task. In either of the cases, process specific properties for the business task are provided in the task properties screen. Double-clicking on any of the tasks, for example a 'Display Login' 807, may access the task properties screen.

System 700 provides a built-in Verifier for testing, troubleshooting and improving the business process and the task models modeled using Designer 713. Each task may be verified by invoking the Verify option within Designer 713. The Verify option runs a set of pre-defined verifications. The verifications are defined for each abstract component. Invoking the Verify option on a task prompts the application designer to input any startup parameters for the task, applies the verifications for the underlying component and presents the results with their severity levels in the Output window of Designer 713.

The Verifier also provides a powerful and friendly mechanism to test and verify a business process. For a business process, the verification is done at two levels. First, the Verifier applies the pre-defined verifications for the Process component on the process being tested. Second, the Verifier gives the application designer the ability to step through each task in the process and verify it. The application designer also has an option to step-through or step-into a sub-process. Stepping-through implies that the Verifier would execute the entire sub-process without a pause and stepping-into implies that the Verifier would execute the first task of the sub-process and wait for the application designer to signal execution of the next task.

In addition, the application designer can setup Watch variables and Break points. Very often, the application designer may want to observe the value of some intermediate information variables as the process is being executed. This is termed as setting up Watch variables. Similarly, the application designer may want the Verifier to stop at some pre-defined points in the process so that the information in the memory of the process may be analyzed. Such points are referred to as Break points.

After the modeling of an application is complete, the application designer may decide to deploy the application using Designer 713. Choosing the deployment option creates an XML version of the application processes and task definitions and stores them on Application Server 711. This is done for performance optimization and has the additional benefit of not requiring a database for the application models at deployment.

There are a number of settings that Designer 713 uses for modeling an application. For example, when a request for modeling of an application comes to Designer 713, it captures the look and feel of the client used by the application designer to model the application. Designer 713 also uses user locale providing date and time format, time zone and language. In addition, resource location for strings and images is also taken care of by Designer 713. Designer 713 also specifies location to store debug information. Also, Designer 713 acts as an indicator to enable or disable memory caching.

4.2 Administration Tool

AT 707 facilitates the system administration of System 700 and applications created using System 700. It connects with one or more web servers through the HTTPS protocol. The browsers supported by AT 707 include Microsoft® Internet Explorer and Netscape Navigator.

AT 707 provides various functions that enable an administrator to manage System 700. These functions include management of various systems level activities as well as application level activities within System 700. Examples of functions that facilitate systems level activities include starting or stopping Engine 717 and managing Mail Server and Desktop Integration Server 719 related settings. Examples of functions that facilitate application level activities include providing process activity reports and statistics to the administrator. Also, application level data such as process and task related statistics could be analyzed using AT 707. For example, process related information includes information such as Wait Time, Execution Time and Process State (for example START, PROCESSING, COMPLETE). AT 707 is also used to set up and configure default global exception handling policies.

AT 707 is also used to perform various security management functions of System 700. For example, AT 707 may perform user management functions such as creating user profiles and accessing user privileges by mapping users or groups to resources. AT 707 facilitates browsing and searching of system logs created by Application Server 711 based on customer ID, component name, user name/id, request ID, date, etc. AT 707 also facilitates browsing and searching of the security audit log.

AT 707 also enables administration of Desktop Integration Server 719. This includes management of Office requests, Office Log files and Office templates. AT 707 also allows the administrator to configure and manage various settings of Engine 717, which include the document and template repository location, queue size, and the number of concurrent processes.

4.3 Engine 4.3.1 Overview of Engine

Engine 717 is the runtime execution module of System 700 that serves (i.e. executes, interprets or processes) the applications requested by a user. All requests that Engine 717 serves effectively imply the execution or the continuation of some business process modeled using Designer 713. Engine 717 processes the requests by executing the tasks related to that business process. The manner in which Engine 717 executes the requests generated by the user is explained by way of an example. When a user wants to use a web application designed using Designer 713, the user clicks on an application link. This action sends a request to Engine 717 for execution/continuation of the process corresponding to the application link. Engine 717 receives and processes this request by loading the process (stored as meta-data) and executing the tasks specified in the process. Depending on the application, the process and user specific information such as session, permissions, etc., may be cached in the memory for servicing ongoing requests from the user and/or for the process.

Engine 717 has an ability to concurrently execute multiple process requests. This execution may require Engine 717 to concurrently execute multiple instances of a single component. This may also require Engine 717 to concurrently execute single or multiple instances of different components. An administrator can configure the number of maximum allowable instances per component while deploying System 700. During installation, a default number is set for each component, based on available resources such as CPU and memory of the Server. Engine 717 provides statistics to further fine-tune these settings depending on the desired response time and resource availability.

Engine 717 uses Message Service architecture to interact with loosely coupled subsystems such as Designer Server 715 and Desktop Integration Server 719. In the preferred embodiment, Engine 717 uses asynchronous queued JMS messages to communicate with Designer Server 715. The Java Message Service (JMS) is a common enterprise messaging Application Programming Interface (API) that is designed to support a wide range of enterprise messaging products. JMS make it easy to write business applications that asynchronously send and receive critical business data and events. Service requests are queued and handled using a combination of First In First Out (FIFO) and a priority criterion. Engine 717 maintains a Message Queue for request management. The Message Queue comprises a Request Queue and a Result Queue.

The Request Queue contains requests that are forwarded to Engine 717. These requests are prioritized on the basis of time and the priority level of the corresponding business process. The Result Queue contains information resulting from execution of the requests. The Result Queue also comprises process and task summary information such as execution statistics. Both the queues are memory based. The Result Queue also performs the function of saving the information related to these queues in Database 721. Both the queues have configurable "timeout" and "max size" properties.

4.3.2 Caching

Caching is used for optimization purposes in Designer 713, Web Server 709, Application Server 711, and Database 721. Caching is provided both at the time of modeling of an application as well as at the time of execution of the application.

When an application designer starts using Designer 713 to create an application, Designer 713 caches all the information related to the application designer including the meta-data created and the object browser. Web Server 709 caches the information that is most frequently requested. Engine 717 manages a central cache called Cache Manager on Application Server 711. All the processes within Engine 717 share a common cache in the Cache Manager. During Startup of Engine 717, all the components that have been configured to be cached at startup are loaded into the Cache Manager. A process is cached the first time it is invoked, if it is not already cached in the Cache Manager. All the subsequent invocations of the process retrieve the process meta-data from the Cache Manager.

4.3.3 Logging

System 700 creates an application log file, which may be accessed by Designer 713 and AT 707. The application log file is stored on Application Server 711 and maintains a log of information related to functioning of various applications. The log would include a list of all the requests for a given application and a list of errors messages; the application log file is different from the log files produced by the J2EE Server, the Web Server, Oracle or UNIX.

The application log file supports filtering on the basis of Request Identifier or User Identifier. This filtering of information enables a user or an administrator to view the log file by requests or users.

All the application error messages are captured in a resources bundle located on Application Server 711 and are accessed by Web Server 709. Application error messages can be broadly divided into two categories—System-defined messages and User-defined messages.

System-defined messages are pre-defined within System 700. A couple of examples of system-defined messages are: "The input file does not correspond to the definition specified in the connector", "Connection to the remote system has been lost due to a communications failure". The first message implies that the file being read did not match the specifications about the file that were defined in the connector factory instance. Similarly, the second message implies that the connection with the remote system was lost most likely due to a communications failure.

User-defined error messages are defined by the application designer using Designer 713. For example, a validation in the User Interface component may need to generate an error message to the end user of the application. As with system messages, user defined messages may be assigned severity levels. Users have the capability to manipulate the messages at runtime.

All the system and user-defined messages in various languages are stored in a global resources bundle. All the messages are associated with an internal code. The resource bundle is cached whenever Web Server 709 accesses the resource bundle. All the components of Engine 717 and Data Access Layer 723 use the resource bundle. For example, a stored procedure has an exception and it returns a code to Data Access Layer 723. Data Access Layer 723 converts the code to a message in the language based on the system locale and the user locale.

The structure of a log message is shown below:

[Application ID] [Request ID] [User ID] [Component Instance Name/Code] [Date-time] [Version Number] [Severity Level] [Message Code] [Message]

where,

Application ID: A unique ID associated with each application;

Request ID: A unique ID given to each request generated in the system;

User ID: A unique ID given to each user of the system;

Component Instance Name: A unique name given to each component instance;

Component Instance Name in the message refers to the component that is required for the execution of the request;

Date-time: Date and the time at which the request in the message is required to be executed;

Version Number Major/Minor version number of the component instance

Severity Level All the messages of System 700 (system-defined as well as user-defined) are broadly categorized into four severity levels; these four severity levels are—INFO, WARN, ERROR and FATAL. The order of severity levels on the basis of increasing severity is—ALL<INFO<WARN<ERROR<FATAL<OFF;

Message Code: a unique code given to each message for identification; and

Message: Actual information/data sent by the message service.

4.3.4 Message Service

The system supports a Message Service architecture that provides a secure and a reliable way of exchanging data between partners in network. In the preferred embodiment, the system uses Java Message Service (JMS). As stated earlier, the Message Service is used to connect Application Server 711 to Designer 713, AT 707 and the application users.

Figure 9:
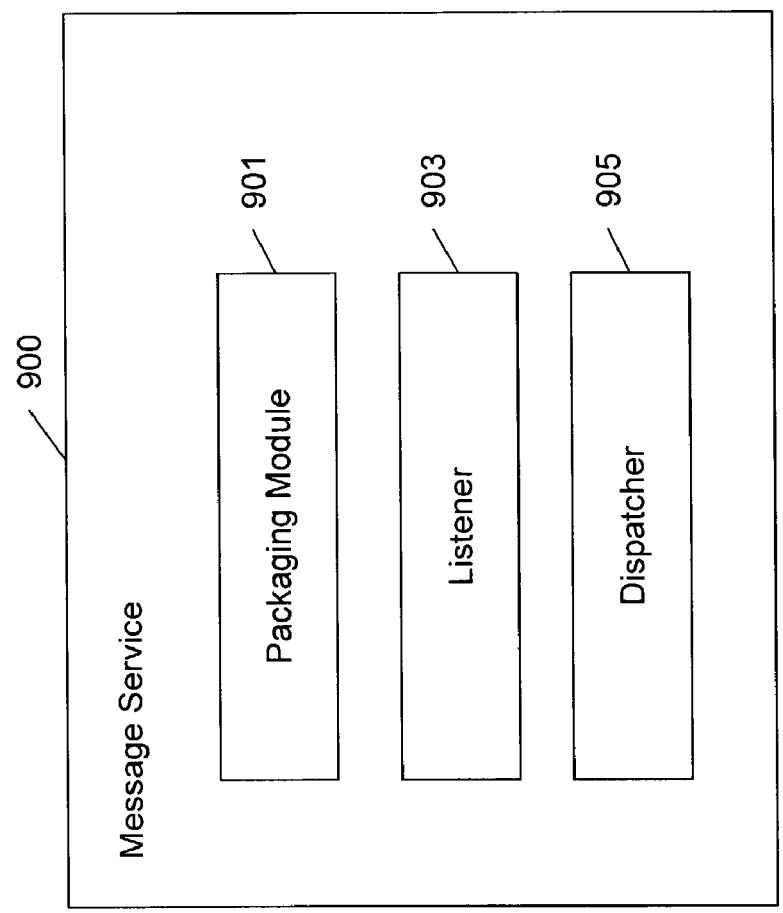
FIG. 9 shows the architecture of Message Service.

Referring now primarily to FIG. 9, the architecture of the Message Service is hereinafter described in detail. A Message Service 900 comprises a Packaging Module 901, a Listener 903 and a Dispatcher 905. Packaging Module 901 constructs the message to be sent. Listener 903 periodically looks for a set of pre-defined directories and file names, which could be sent by or to remote systems. The incoming files could be associated with different business processes within the application. When Listener 903 receives a file with an associated process, it deposits a request to Engine 717 to execute the required process. Dispatcher 905 is used to dispatch the message to the destination system.

Figure 10:
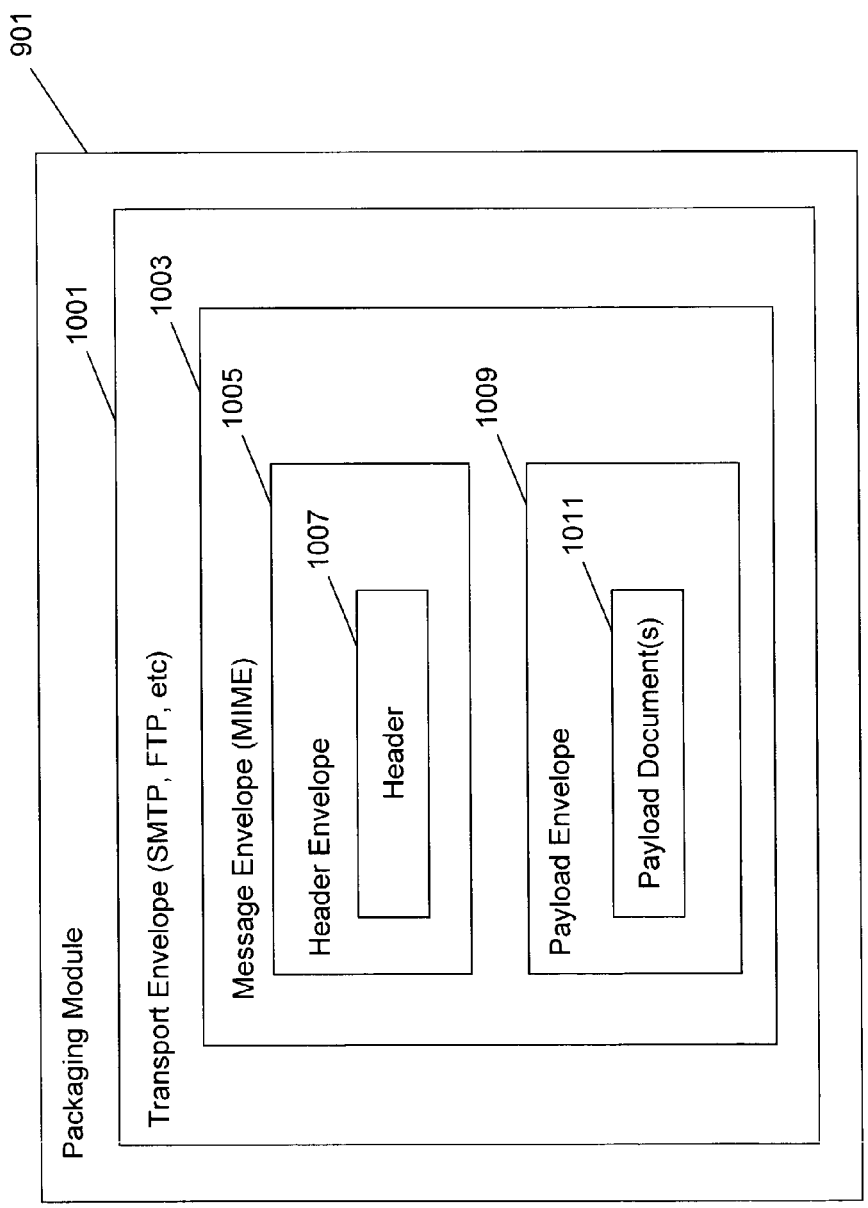
FIG. 10 shows the packaging module of the Message Service.

Referring now primarily to FIG. 10, Packaging Module 901 of Message Service 900 is hereinafter described in detail. The messages are transferred over various transport protocols such as SMTP, FTP, and HTTP(S), which forms a Transport Envelope 1001. A diverse set of document types such as XML, HTML and RTF (Rich Text Format) are handled by a Message Envelope 1003 using MIME (Multi-Purpose Internet Mail Extensions). Each message has two sections—a Message Header 1007 section provided within a Header Envelope 1005 and a Payload 1011 section provided within a Payload Envelope 1009. Message Header 1007 is necessary for routing and delivery of the message to the destination. Payload 1011 contains the document to be transferred. The messages may transport an interface file, a Word document or a report. The files are attached as the payload section of the message by Transport Envelope 1001.

The messages can be one-way messages or two-way messages. Two-way messages i.e. request/response messages are provided by SOAP (Simple Object Access Protocol), WSDL (Web Services Description Language), UDDI (Universal Description, Discovery, and Integration), MQ (Message Queuing) Series and Tibco. In the preferred embodiment, implementation has been provided for SOAP and XML/HTTP(S) based communication.

4.3.5 Engine Startup Process

Figure 11:
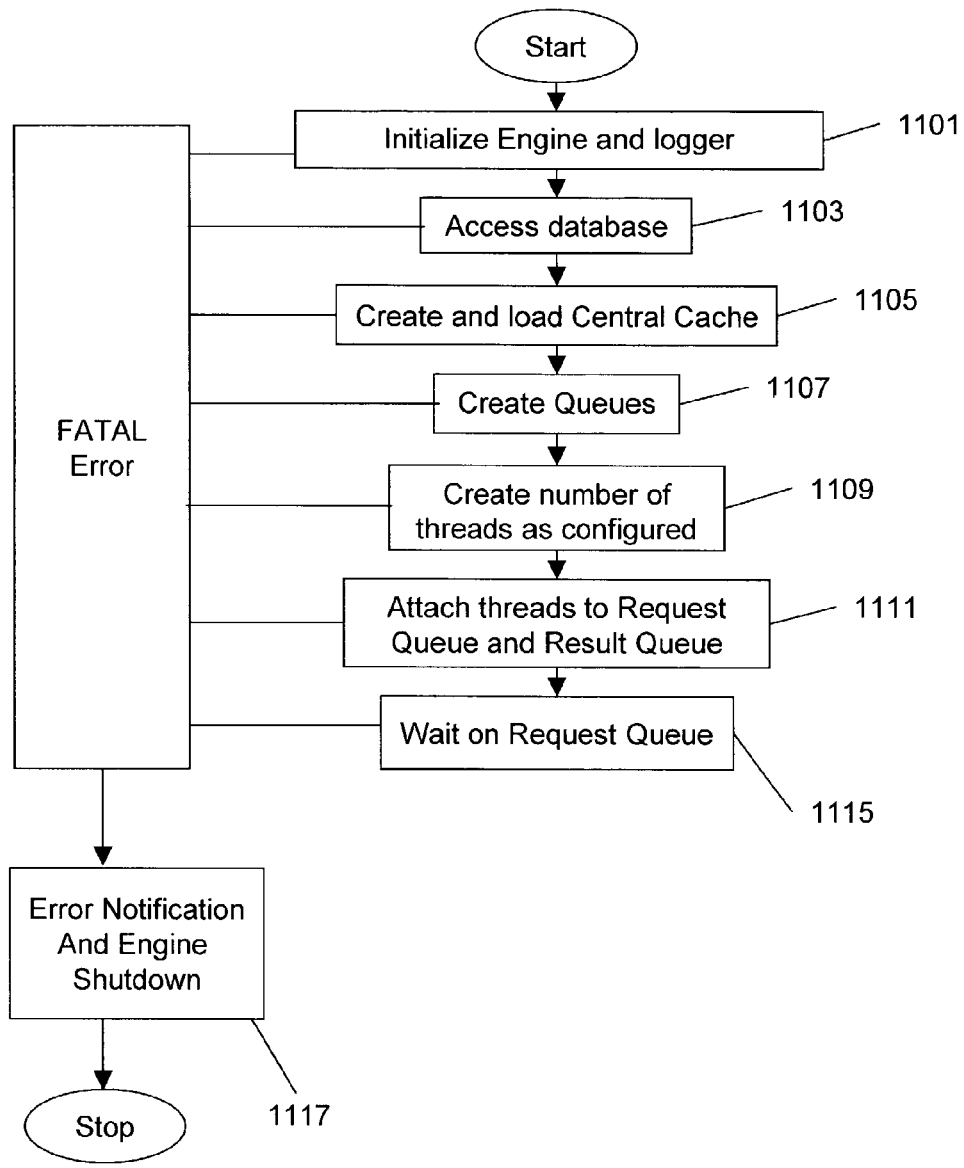
FIG. 11 illustrates the Engine start-up process.

Referring now primarily to FIG. 11, Engine 717 startup process is hereinafter described in detail. At step 1101, Engine 717 is initialized. In the startup process, Engine 717 reads a number of parameters specified in the App Server Configuration XML file. These parameters include—Mail server settings, —Logger settings, the number of rollover files, the email IDs for the administrator alerts and the severity level and—the number of times Engine 717 will try to run a failed request. Engine 717 reads the User ID and the password and decrypts them. Further, Engine 717 initializes the Log Writer and configures alerts for messages of different severity levels. The Log Writer writes log messages to an ASCII text file on.

Next, at step 1103, Engine 717 accesses Database 721 through Data Access Layer 723. Data Access Layer 723 connects to Database 721 using a JDBC connection pool. At step 1105, Engine 717 creates and loads the Cache Manager. To load the Cache Manager, Engine 717 loops through every component and identifies those that have their 'Load at Startup' property set to 'Yes'; this is set by the application designer while modeling the application. Thereafter, Engine 717 locates the components' XML definition files from Application Server 711 and converts the XML files to Java objects. This conversion is achieved using a third party software Castor™ that maps XML files to Java objects.

Next, at step 1107, Engine 717 receives requests from the User Interfaces and creates a Request Queue and a Result Queue (as described in section 4.3.1). At step 1109, Engine 717 creates a number of threads as configured by the application designer or as set by default. At step 1111, the threads are attached to the Request Queue and the Result Queue.

The Scheduler prioritizes and de-couples Engine 717 from the Request Queue. The Scheduler looks for requests that were abnormally terminated during the most recent shutdown and assigns them the highest priority. At step 1115, Listener 903 is initiated, so that any external service request accessing System 700 through text files is acted upon. Listener 903 periodically polls the ports that have been configured using the Data Integration Module (discussed later in section 4.6.3.7) in Designer 713. After making change in the queues, Engine 717 waits for new requests to arrive in the Request Queue at step 1115. If a request arrives, System 700 goes to step 1111. While performing any of the steps 1101-1115, if a fatal error occurs, System 700 jumps onto step 1117. At step 1117, an error notification is sent and Engine 717 shuts down. Engine 717 keeps processing as long as there are requests to process and is in a wait state when there are no requests, until it is shut down.

4.3.6 Engine's Process Execution Flow

Figure 12:
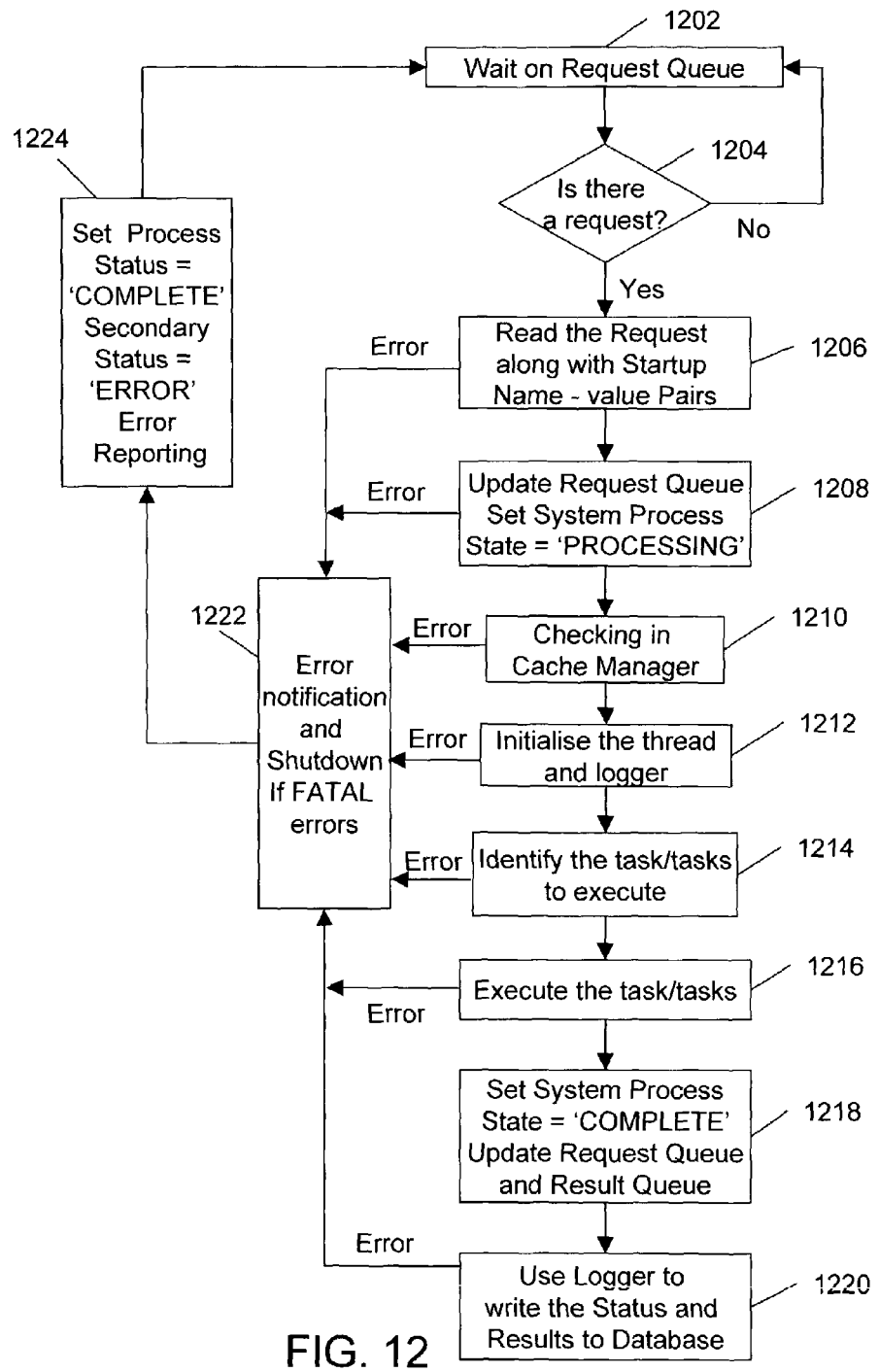
FIG. 12 illustrates the execution of flow for any process in the Engine.

Referring now primarily to FIG. 12, the sequence of tasks executed by Engine 717 in servicing a request is hereinafter described in detail. When a request is selected to be executed from the Request Queue, all the business tasks of the corresponding business process are identified. The selection of a request for execution depends on the execution time attribute of the request. The execution time attribute can have a future date and time value, if required. As described in the previous section, the order of selection depends on the priority of the associated process. Engine 717 reads the earliest request from the sorted Request Queue based on the condition that the scheduled date-time is lesser than the current date-time. After selecting a particular request, Engine 717 identifies the tasks that need to be executed to process the request. Engine 717 has an Execution Module, in which execution of these tasks takes place. The result of execution is written to the Result Queue. After processing the request, Engine 717 goes back to wait state if there are no more requests to process.

The Execution Module comprises a component execution module (described later in section 4.6.1), a standardized execution module (for accessing the meta-data from the Database) and a standardized messaging architecture to handle communication between the component execution modules.

At step 1202, Engine 717 waits for a request in the Request Queue. At step 1204, Engine 717 checks if there is a request in the Request Queue. If there is a request in the Request Queue, System 700 moves to step 1206, otherwise it goes back to step 1202 and waits for a request. At step 1206, Engine 717 reads the request along with the Startup parameters. After reading the request, Engine 717 updates the Database Queue (used for temporarily storing a request and its status in the Database 721 during its execution) and the Process State (explained in section 3.6.2) is set to "Processing" at step 1208. At step 1210, Engine 717 checks whether the requested Process is already in the Cache Manager; if the process is not present, Engine 717 fetches the corresponding XML files and converts the XML files to Java objects and loads the process into the Cache Manager. At step 1212, Engine 717 initializes an EJB instance and the Log Writer. At step 1214, Engine 717 identifies the tasks that constitute the process. After identifying the tasks to be executed, Engine 717 executes the tasks at step 1216. The tasks are executed either synchronously or asynchronously, as configured, until a Process End is reached.

There could be many parallel asynchronous task executions within the same process. A 'Synchronization' task may be used to explicitly model a 'Wait' state to make sure all the dependent tasks are completed before proceeding to execute the next task. If Engine 717 comes across a 'Synchronization' task, Engine 717 waits with a long timeout for all the dependent tasks to be completed. If there are no more tasks to be executed because of reaching a Process End, Engine 717 updates the status of the Request in the database as 'Complete' and updates the Result Queue by writing the result details to the Result Queue at step 1218. In addition to the Message Service queues, a Database Queue is also provided for storing the request in Database 721. The Database Queue stores the request messages along with their status till the completion of request's execution by Engine 717. Once Engine 717 has completed the execution of the request, at step 1220, the request message is removed from Database Queue and is logged into a Database Log Table by the Result Queue. The Database Log Table is a duplicate copy of the Request Queue and is permanent while the Request Queue is memory based. While performing any of the steps 1206-1220 if a fatal error occurs the system moves to step 1222. At step 1222, the processing of the request is stopped. At step 1224, the system sets the Process State to "Complete" and reports the error. Thereafter, the system goes back to step 1202.

4.3.7 Exception Handling

Each process has a built-in Exception Object and Handler. System default actions are taken when an exception occurs. System default actions can be over-ridden by the application designer at the time of modeling. The application designer may provide custom alerts and exception messages at the process level.

Any message generated through System 700 can be of the following severity level: Informational, Warning, Debug, Error and Fatal. As earlier described, at step 1222, if an exception is generated with a severity level of type "Fatal" or "Error", the execution of the process stops and the Process State of the process is set to "Error".

Figure 13:
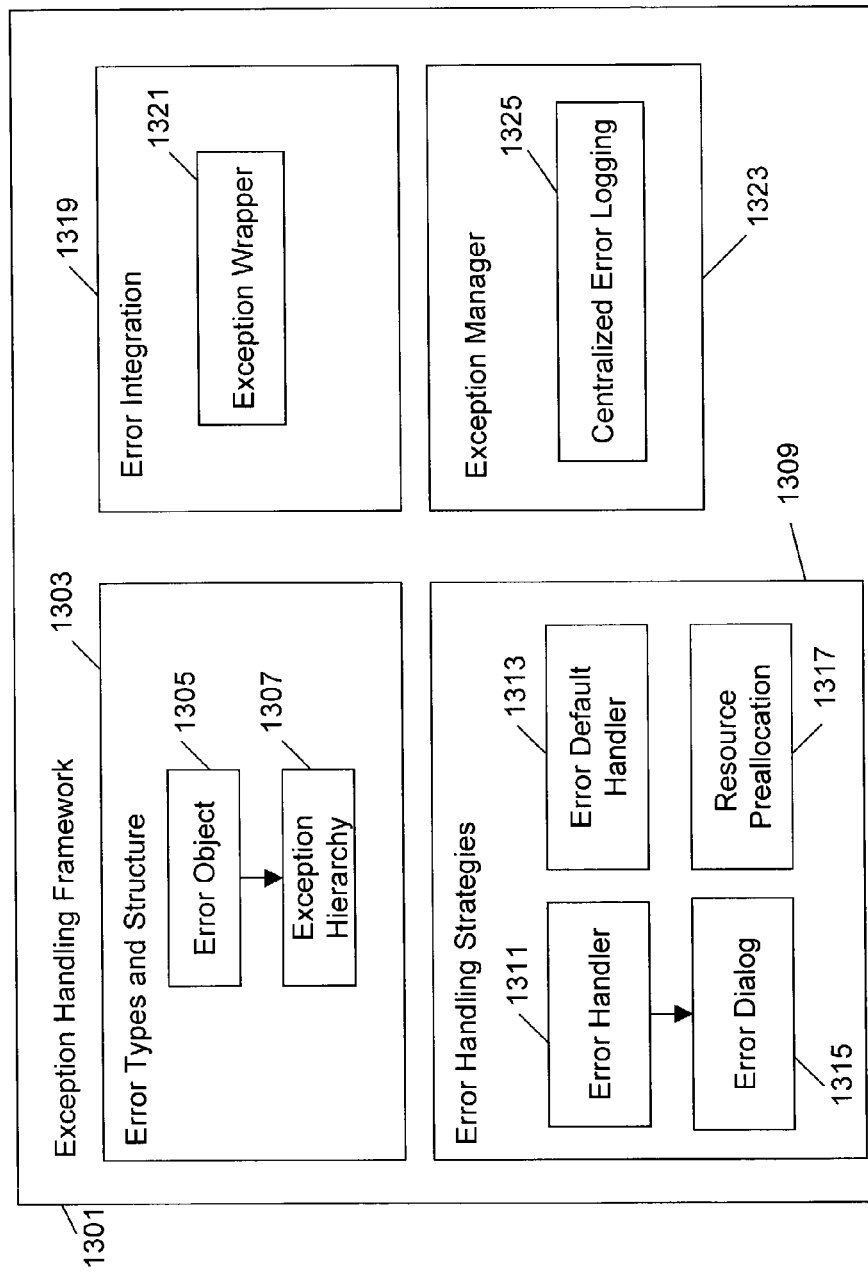
FIG. 13 shows the Exception Handling Framework.

Referring now primarily to FIG. 13, the Exception Handling Framework is hereinafter described in detail. This framework is designed independent of client technologies. It could be used with multiple clients such as a Java application, an applet, a servlet and Personal Digital Assistants (PDAs). In accordance with the preferred embodiment of the invention, implementation has been provided for a Java application and a servlet.

Exception Handling Framework 1301 comprises a field called Error Types and Structure 1303. Error Types and Structure 1303 contains an Error Object 1305 and an Exception Hierarchy 1307. Error Object 1305 encapsulates all the information about an error and its context. The application designer can create and use the error objects like other data.

Exception Handling Framework 1301 comprises another field called Error Handling Strategies 1309. Error Handling Strategies 1309 contains an Error Handler 1311, which is the error handling subsystem used by the client to process an error. Error Handler 1311 uses an Error Dialog 1315 to display the error message on the client's screen. Error Handling Strategies 1309 also contains an Error Default Handler 1313 to avoid any exceptions that are not handled by Error Handler 1311. A Resource Preallocation 1317 in Error Handling Strategies 1309 performs two functions. First, it creates Error Dialog 1315 at Startup and then shows or hides Error Dialog 1315, as appropriate. It also implements an abstract factory for all the exception handling classes and performs memory management of the exceptions.

Exception Handling Framework 1301 also comprises an Error Integration 1319, which further comprises an Exception Wrapper 1321. Exception Wrapper 1321 integrates a ready-to-use library into Exception Handling Framework 1301.

Exception Handling Framework 1301 also comprises an Exception Manager 1323. Exception Manager 1323 comprises a Centralized Error Logging 1325. Exception Manager 1323 uses Centralized Error Logging 1325 to log the relevant exceptions. All the exceptions are filtered and the relevant exceptions are identified on the basis of their severity level. All the error messages are written to the log file based on the system wide severity level. The system state can have one of the following possible values—Start, Processing, Complete, Error and Exception. Applications can proceed or abort depending on the severity of the error.

4.4 Interaction of the Clients with the Service Layer

Figure 14:
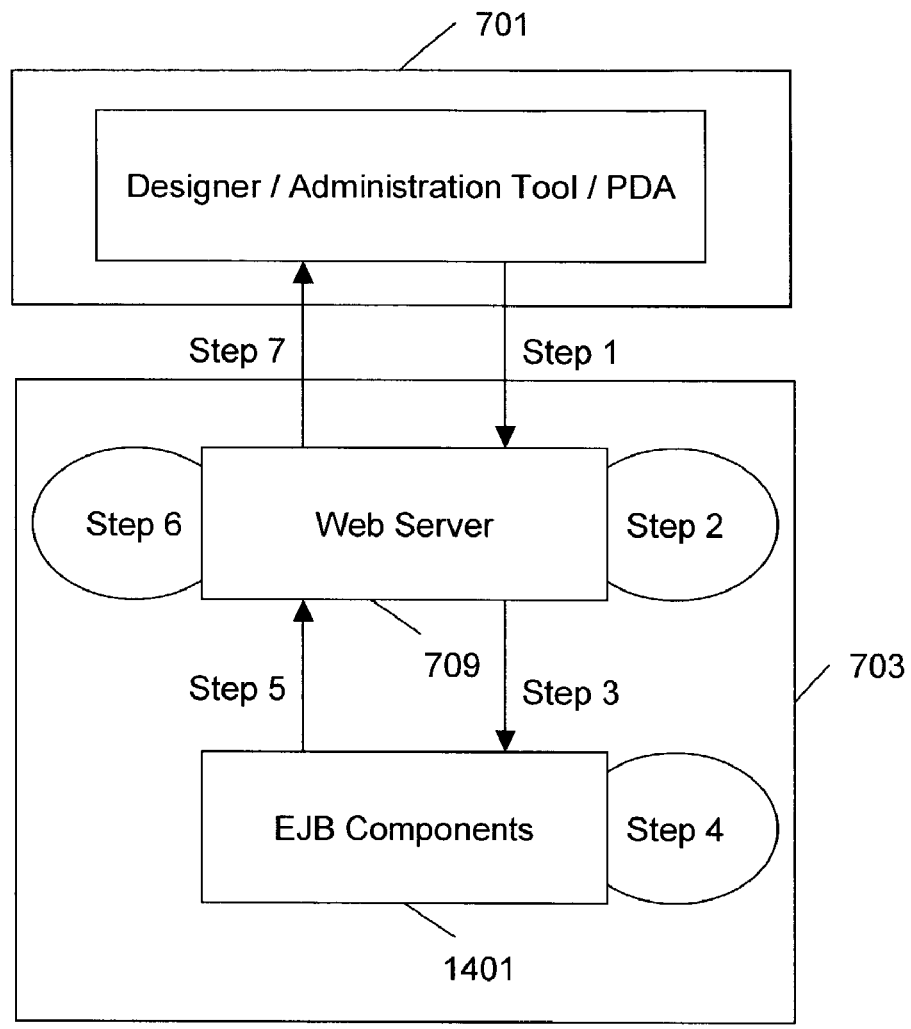
FIG. 14 shows the interaction between the Clients and the Service Layer.

Referring now primarily to FIG. 14, the interaction between the User Interfaces of Presentation Layer 701 (Clients) and Service Layer 703 is hereinafter described in detail. When an application designer or the system administrator logs onto System 700, the login request is received at step 1 by Web Server 709. In the preferred embodiment, Web Server 709 interacts with Designer 713 and AT 707 through HTTP(S). In case a user from a remote system interacts with Application Server 711, integration with the remote system is provided by a Data Integration Module (discusses in later section 4.6.3.7). The Data Integration Module uses the FTP protocol to facilitate interaction with the remote system. For example, if a file extract is required to be fetched or sent to a mainframe, either FTP or secure FTP is used. Pretty Good Privacy (PGP) capabilities could also be used to ensure security. Engine 717 acts as a mail client and integrates itself with other SMTP compliant mail servers. Web Server 709 can handle both HTML as well as XML requests from the User Interfaces of System 700.

Web Server 709 processes the HTML or the XML request at step 2. This processing ensures that the format of the request is compatible with the format used by Application Server 711. Web Server 709, at step 3, then calls one or more EJB components 1401 within Designer Server 715 using the Internet Inter Object Request Broker Protocol (110P). Designer Server 715 accesses Database 721 and/or Engine 717 at step 4 in order to process the request. Thereafter, at step 5, Designer Server 715 returns the data obtained by processing the request to Web Server 709. This data is converted to an appropriate format (such as XML, HTML or WAP) at step 6 compatible with the User Interface. Finally, at step 7, Web Server 709 dispatches the response to the User Interface.

Figure 15:
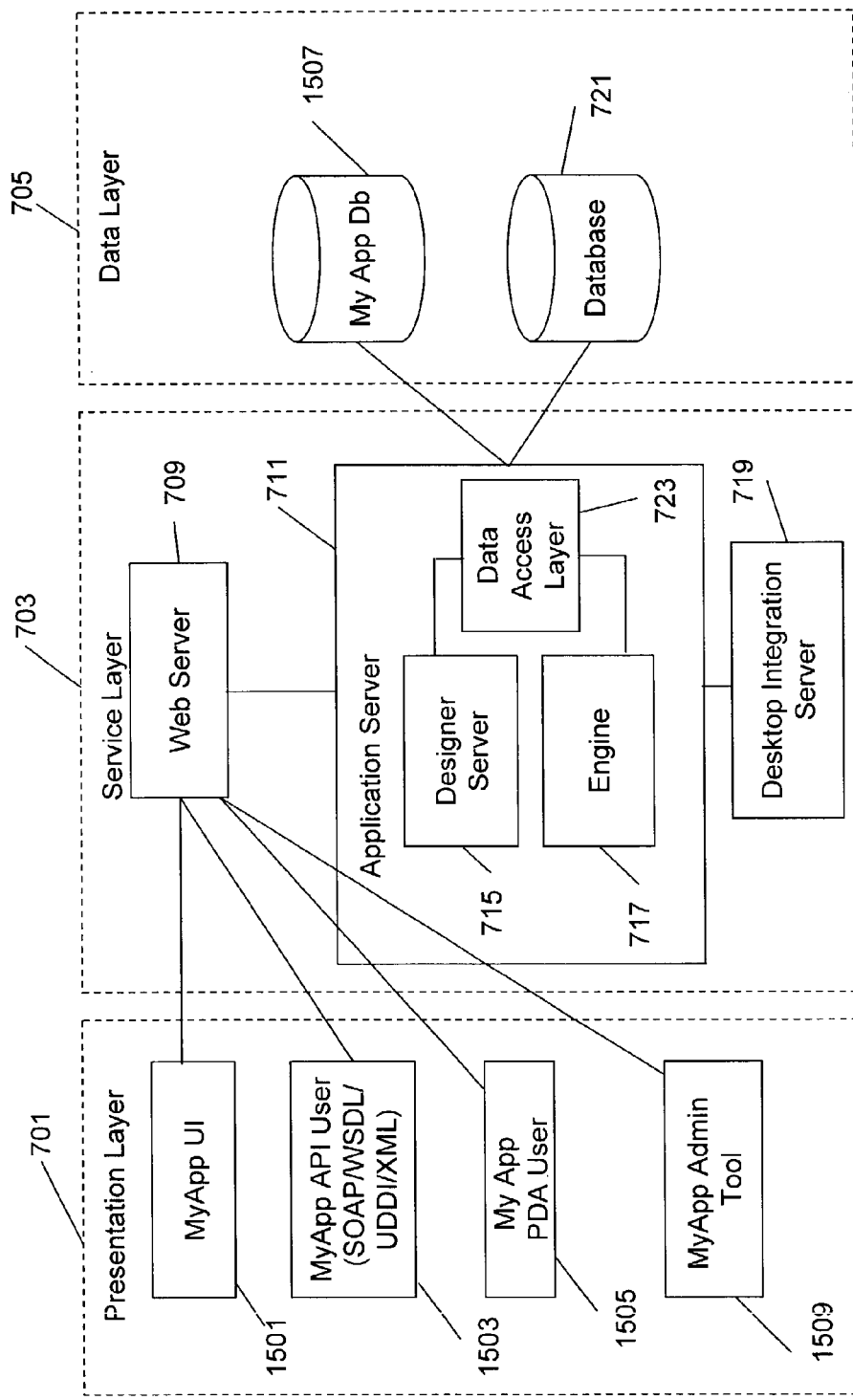
FIG. 15 illustrates a network diagram of an application designed using the system in accordance with the preferred embodiment of the present invention.

4.5 MyApp, an Application Designed Using the Designer 4.5.1 Network Diagram of MyApp Referring now primarily to FIG. 15, a network diagram of MyApp, an application designed using Designer 713, in accordance with the preferred embodiment of the present invention is hereinafter described in detail. The entire application is modeled using Designer 713 and is stored as meta-data in Database 721. The network architecture supports the three layers—Presentation Layer 701, Service Layer 703 and Data Layer 705.

Presentation Layer 701 comprises the User Interfaces (MyApp clients). These User Interfaces can be of several types—a desktop or browser-based application, a third party system acting as a client through an Application Programming Interface (API) or a PDA client. All the applications modeled using Designer 713 would also have an Administration Tool, which is the same as AT 707. A MyApp UI 1501 is the application's User Interface, which is associated with one or more business processes being executed by Engine 717. A MyApp API User 1503 is any third party system that invokes the application through an API. System 700 provides a generic API for allowing third party systems to communicate with MyApps modeled using Designer 713.

Service Layer 703 comprises Web Server 709, Application Server 711 and Desktop Integration Server 719.

Web Server 709 runs a Controller Servlet compliant with industry standard web servers. This Controller Servlet is a program that runs on Web Server 709 that facilitates connection of MyApp UI 1501, MyApp API User 1503, a MyApp PDA User 1505 and a MyApp Admin Tool 1509 to Application Server 711. MyApp clients interact with Web Server 709 through HTTP(S). In the preferred embodiment, Web Server 709 can handle both HTML and XML requests from User Interfaces of MyApp.

Application Server 711 comprises Engine 717. Engine 717 serves (i.e. executes or interprets) requests generated by MyApp clients as they use the application. Note that even the MyApp user interfaces are models that have been created using Designer 713 and are served by Engine 717. The administrator interacts with MyApp Admin Tool 1509 to administer MyApp.

Desktop Integration Server 719 provides services by integrating Engine 717 with word processors, spreadsheets, presentations, mail servers, fax servers and printers. In the preferred embodiment, the implementation has been provided for integration with Microsoft suite of products such as Microsoft® Word, Excel, PowerPoint, and FAX and SMTP-compliant mail servers. A Visual Basic Service runs on Desktop Integration Server 719. Desktop Integration Server 719 communicates with Engine 717 using an internal queue and provides services specific to the applications identified above.

Data Layer 705 comprises a MyApp Database 1507 and Database 721. MyApp Database 1507 contains all the application level data. As described earlier, Database 721 stores all the application models, i.e., processes with their properties and tasks with their properties. Database access is accomplished using Data Access Layer 723 (DAL). The DAL 723 connects to MyApp Database 1507 and Database 721 through a connection pool using the Java Database Connectivity (JDBC) protocol.

4.5.2 Interaction Between MyApp and the Service Layer

Figure 16:
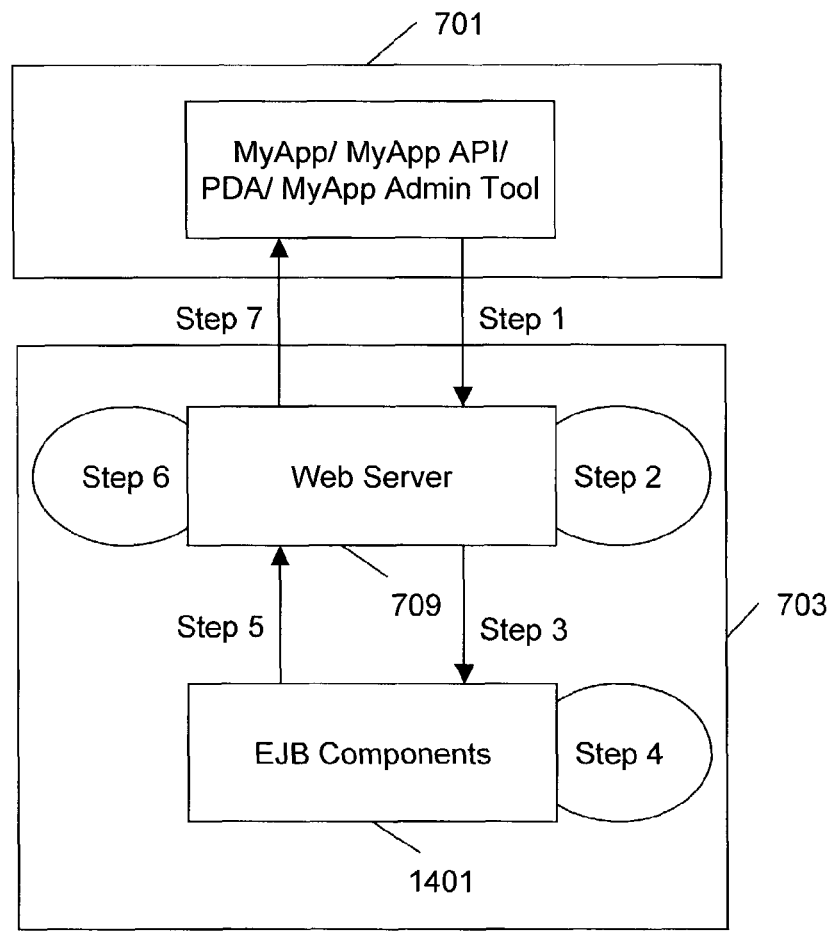
FIG. 16 shows the interaction between the MyApp clients and the Service Layer at runtime.

Referring now primarily to FIG. 16, the interaction between the MyApp clients and Service Layer 703 at runtime is hereinafter described in detail. When a MyApp user (a third party system or the MyApp administrator) generates a request to launch MyApp and/or its administration module, a login request is received by Web Server 709. In the preferred embodiment, Web Server 709 interacts with MyApp UI 1501, MyApp API User 1503, MyApp PDA User 1505 and MyApp Admin Tool User 1509 through HTTP(S).

Web Server 709 processes the HTML or the XML request at step 2. This processing ensures that the format of the request is compatible with the format used by Application Server 711. At step 3, Web Server 709 calls one or more EJB components 1401 within Engine 717 using the Internet Inter ORB Protocol (IIOP). At step 4, Engine 717 accesses Database 721 in order to process the request. Thereafter, at step 5, Engine 717 returns the data obtained by processing the request to Web Server 709. At step 6, this data is converted to an appropriate format (such as XML, HTML or WAP) compatible with the User Interface. Finally at step 7, Web Server 709 dispatches the response to the User Interface.

4.6 Components

As stated before, the Process Palette contains an iconic representation of the components available to the application designer. Components may be of two types: flow and functional. Flow components allow the application designer to model some aspect of the process flow. Functional components, on the other hand, allow the application designer to model a function using business logic.

4.6.1 The Anatomy of a Component

Each component represents a dimension of functionality that is commonly required in software applications. By way of an example, the connector factory component represents the need for systems-to-systems integration. All components are designed such that the functionality embodied in the component is externalized in the form of meta-data.

Each component has a similar structure and comprises three sub-parts. The first sub-part is a meta-data structure. "Meta-data" is a collection of application specific parameters. A component when provided with a meta-data becomes a task. The second sub-part of a component is a set of Graphical User Interface (GUI) objects. These objects encapsulate the meta-data structure and provide a user-friendly environment for the application designer to create the meta-data. The third sub-part is a code segment that understands the meta-data structure and the implied functionality of the component.

The code segment uses the meta-data and the abstract function of the component to perform a business specific task.

Figure 17:
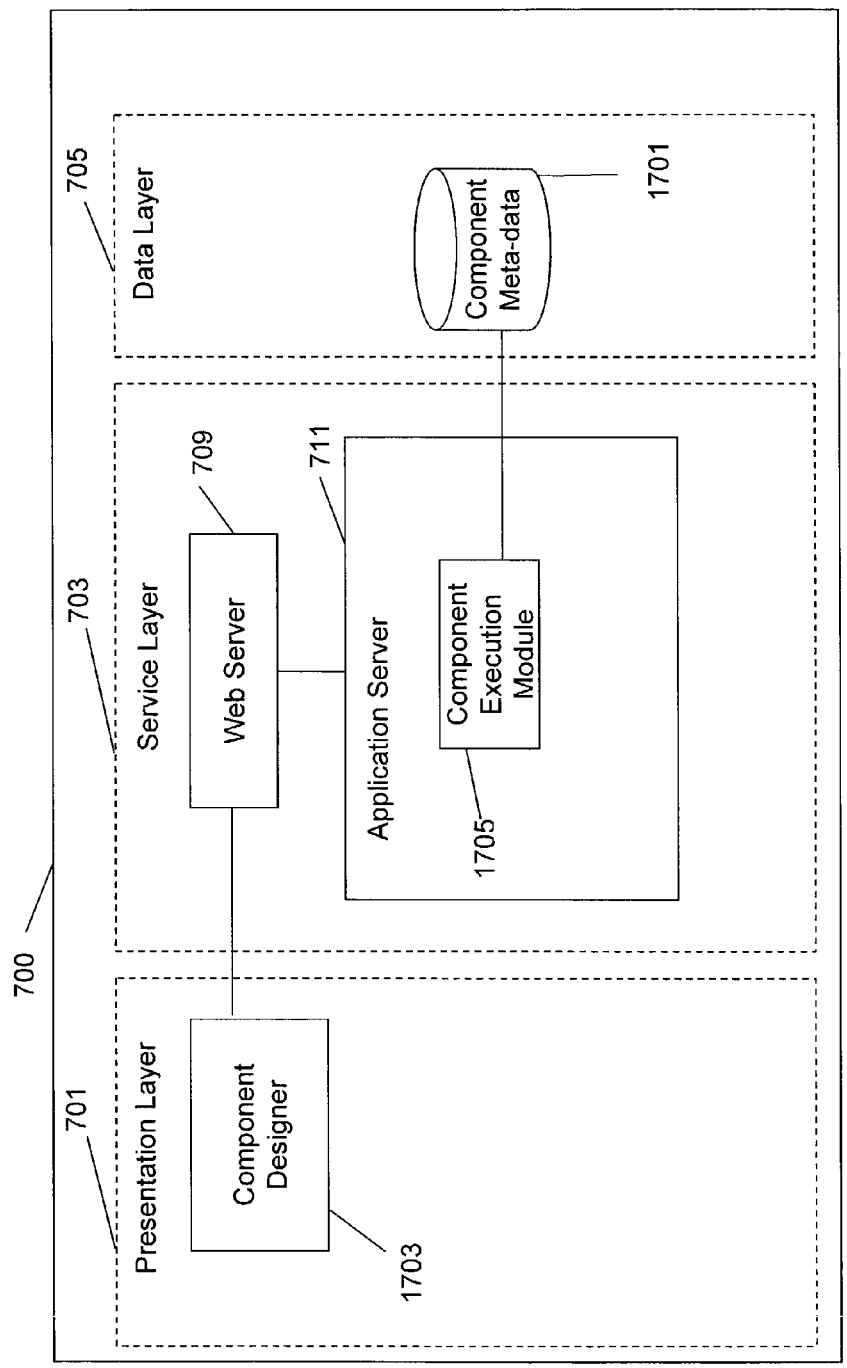
FIG. 17 illustrates the anatomy of a component.

Referring now primarily to FIG. 17, the anatomy of a component is hereinafter described in detail. A Component meta-data structure 1701 (stored in Database 721) represents an abstraction of the functionality dimension that the component represents. For example, the meta-data structure for the connector factory component will represent all the elements that various systems-to-systems integration tasks will require and are relevant to a specific integration task. The complexity of the meta-data structure is directly proportional to the complexity of the component's functionality. A Component Designer 1703 is a graphical user interface for the application designer to enter these attributes for a specific integration task. A Component Execution Module 1705 is the code segment that is knowledgeable about the relationship between the meta-data structure and the implied functionality. All component execution modules are part of Engine 717.

The concept of meta-data structure is illustrated with reference to the example of a component called "Model" component. The component is used in a business process that requires the following computation:

$$R=(P2 \times C)/(P1 \times (N \times P))$$

where,
R=average revenue per sale;
C=Credit line;
N=# of orders in a given period;
P=profit margin for the average order;
P1=profitability of payment; and
P2=(1−P1).

This formula is provided as meta-data to the Model component. The Model component has the capability of accepting computational expressions as meta-data and evaluating them. The variables used in the formula may be provided by a user, may have been already created in a previous task or may be accessed from database.

4.6.2 Flow Components

Process Palette 805 comprises a number of flow components including but not limited to, selection (arrow), Process Start, Process End, line, branching (rule), loop, synchronization, annotation and formatting.

4.6.2.1 Selection (Arrow)

The selection (arrow) component allows the application designer to select existing tasks and create new tasks. The application designer can also select multiple tasks and perform operations such as cut, copy, move and paste.

4.6.2.2 Process Start and Process End

The Process Starts and Process End components allow the application designer to denote where a process starts and ends. There may be multiple Process Start and Process End components in a process. Multiple starts allow the application designer to design an execution strategy that serves more than one purpose. Multiple ends denote the natural end points in a process.

Figure 18:
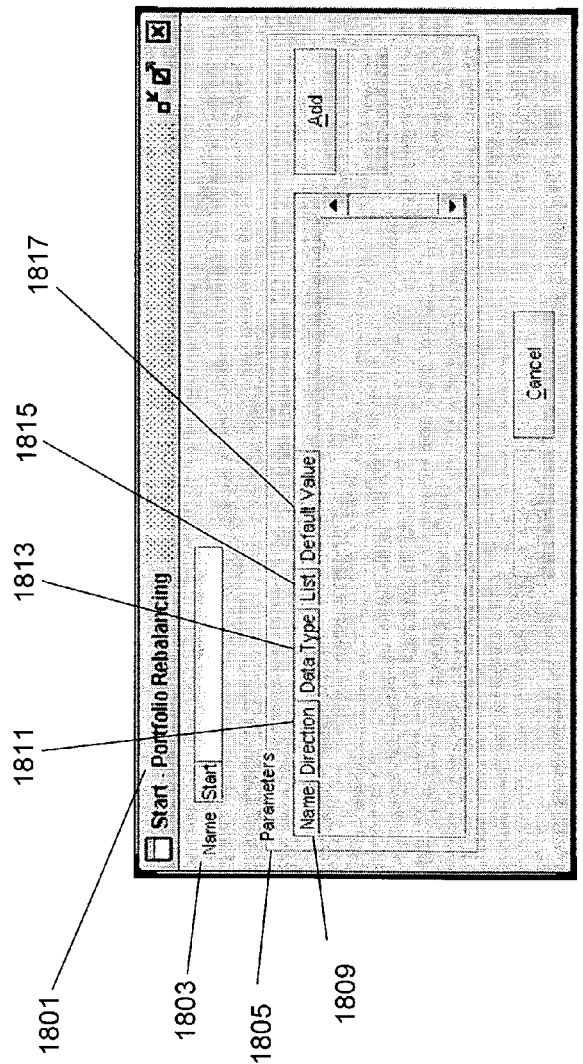
FIG. 18 displays the Process Start component's meta-data structure.

Process Start also allows the application designer to declare startup parameters that the application designer designs as required for the current process to execute. These parameters are provided by the process or the program that invokes the current process. Referring now primarily to FIG. 18, the Process Start component's meta-data structure is hereinafter described in detail. The meta-data structure comprises an identifier for process start object 1801, a name 1803 and a set of parameters 1805. Each parameter object in turn comprises a Name 1809, a Direction 1811, a Type 1813, a List 1815, and a Default Value 1817. This set of meta-data allows the application designer to provide startup parameters to a process. The parameter ID is system generated and unique to the process. Name identifies the parameter to the application designer. Direction allows the application designer to declare whether the parameter is an incoming or an outgoing parameter. Type declares the parameter's type that may be String, Numeric, Boolean, etc. List allows the application designer to associate a list of values to the parameter. This implies that the parameter may have any one of the values in the list. Finally, Default Value allows the application designer to declare a default value for the parameter in case the parameter is not provided by the calling process.

4.6.2.3 Line

The line component allows the application designer to connect two tasks. In certain cases, the line connecting the two tasks needs to denote an outcome. For example, in the case of the branching (rule) component, the process may branch into multiple tasks depending on the outcome of the branching (rule) component. The line component's meta-data structure contains a line outcome attribute that is specific to each instance of the line component. In the case of the branching (rule) component, the outcome is binary. However, in the case of other components like the Decision Tree, the outcome is m-nary.

Figure 19:
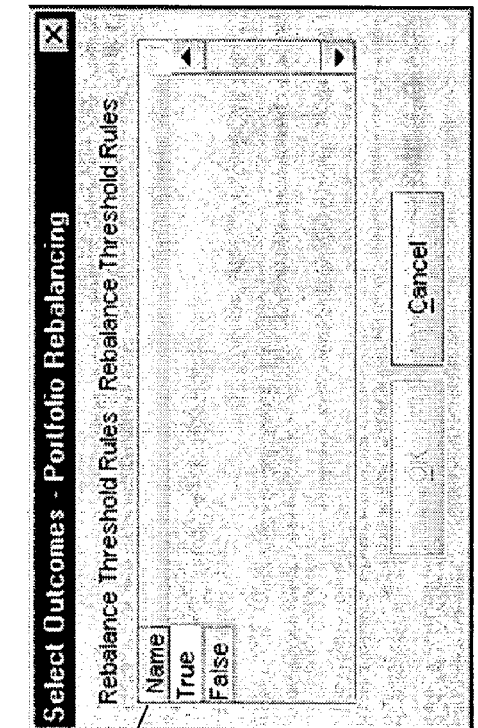
FIG. 19 displays the line component's meta-data structure.

Referring now primarily to FIG. 19, the meta-data structure for the line component comprises a name attribute with multiple possible values 1901. The name attribute refers to the outcome that the line is intended to represent.

4.6.2.4 Branching (Rule)

The branching component allows the application designer to create separate branches of execution in the process as a function of some condition. The branching component is also termed as the rule component. The rule component is both a flow and a functional component.

The meta-data structure for a rule reflects the following abstraction. The branching rule is a condition that may comprise single or multiple conditions. Each condition may be abstracted to contain a left-hand side (LHS) expression, a right-hand side (RHS) expression and a relational operator that relates the LHS and RHS. Relational operators are =, <, >, <=, >=, not equal to, contained in, contains, like, etc. When a rule has multiple conditions, the conditions may be connected using either conjunctively (AND) or disjunctively (OR) operators.

Figure 20:
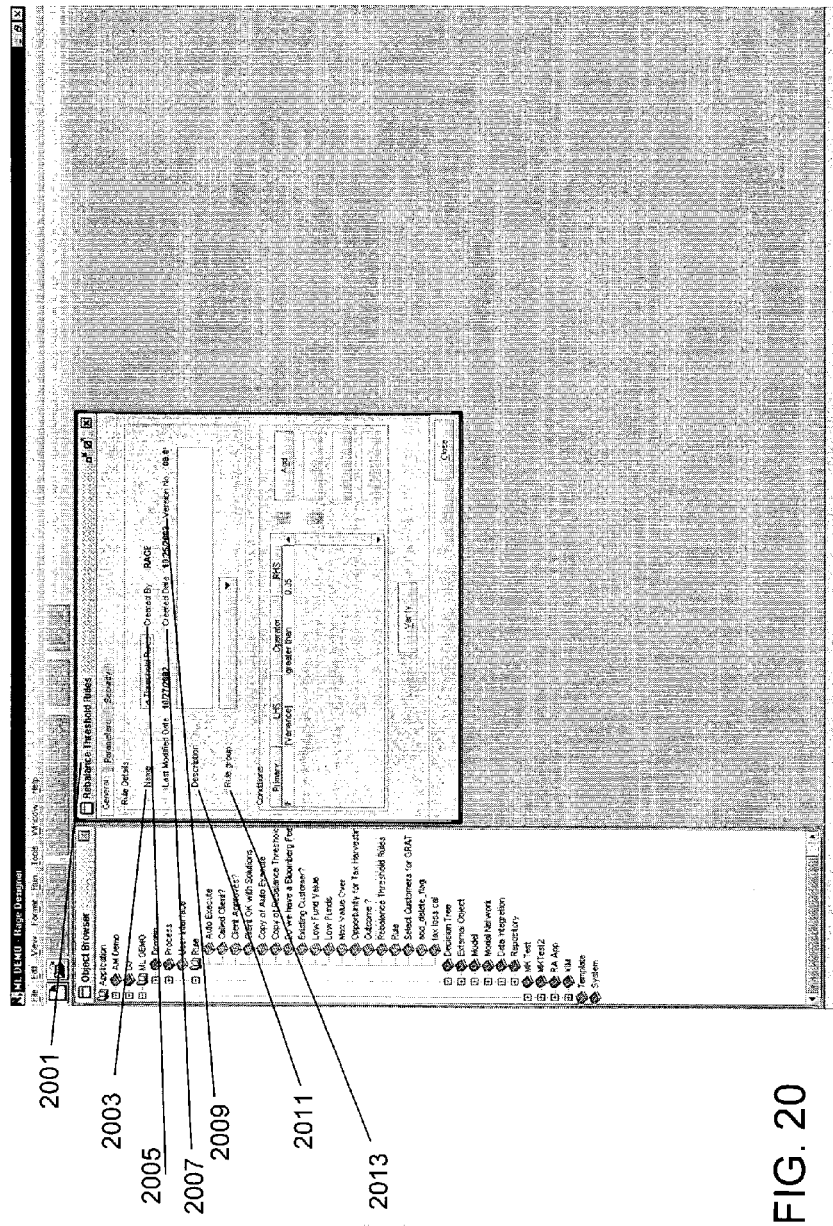
FIG. 20 displays the business Rule meta-data structure.

Referring now primarily to FIG. 20, the business Rule meta-data structure is hereinafter described in detail. The meta-data structure for a rule extends over two levels. At the top level are attributes that are unique to the rule: an Identifier 2001, a Name 2003, a Created By 2005, a Created Date 2007, a Version No. 2009, a Description 2011 and a Rule group 2013. Rule group 2013 allows the application designer to group rules into convenient classifications that improve their organization in Object Browser 802.

Figure 21:
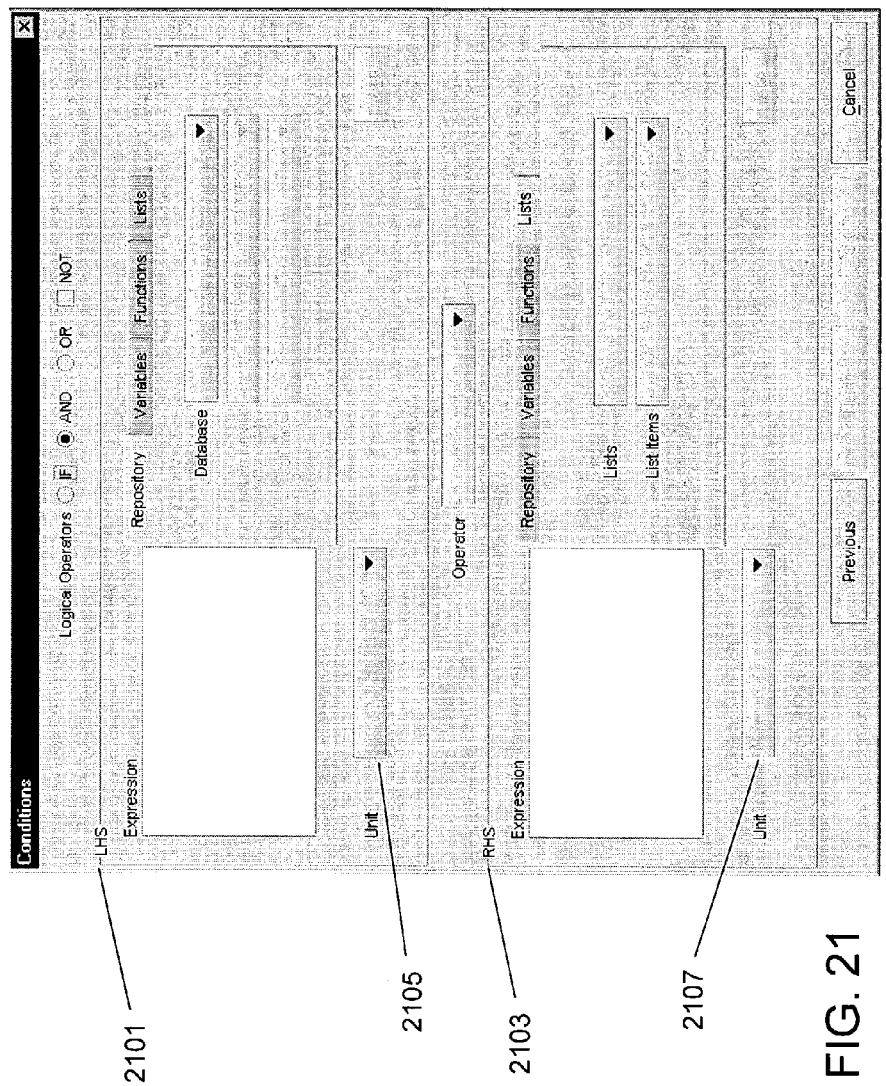
FIG. 21 displays the condition meta-data structure.

The rule's condition represents the second level of the rule's meta-data structure. FIG. 20 displays the rule's conditions that can be one or many. Referring now primarily to FIG. 21, the condition meta-data structure is hereinafter described in detail. The meta-data structure allows the application designer to compose an LHS 2101 and an RHS 2103 of a condition using process memory information, information from the application database, and/or various inbuilt functions. Where the LHS 2101 or RHS 2103 involves date/time information, a Unit 2105 and 2107 allow the application designer to define the time unit (business day, day, week, month, etc.)

4.6.2.5 Loop

The loop component, as the name signifies, allows the application designer to model repetitive execution within the process. It has two parts: loop start and loop end. Loop start denotes the place at which repetitive execution is to begin. Loop end denotes the place at which the repetitive execution is to end. The loop component's meta-data structure contains the number of times the repetitive execution must be done and the stopping condition that may be a rule.

Figure 22:
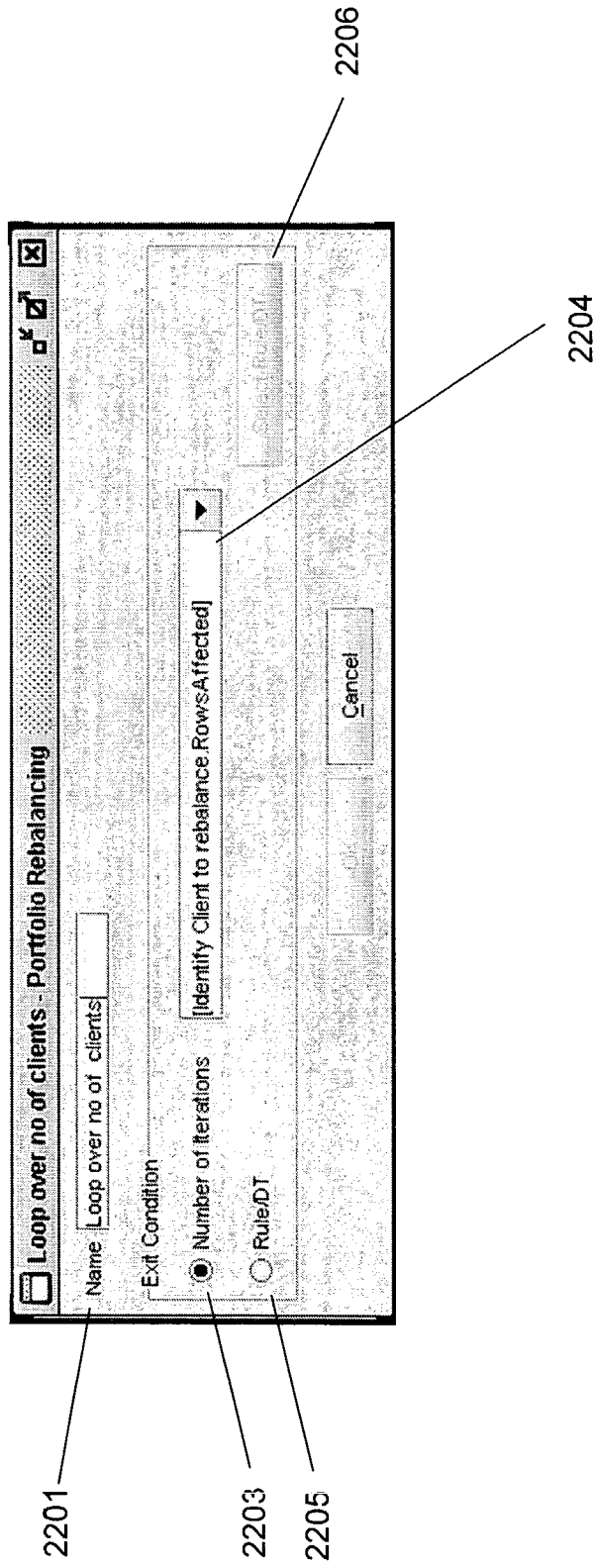
FIG. 22 illustrates the meta-data structure for the loop component.

Repetitive execution needs an exit condition. Exit conditions may be a function of information in the process memory (a previous task, a database, or a static numeric value). The abstraction reflected in the loop component's meta-data structure allows for all of the above. The application designer can model the exit condition however complex it may be. Referring now primarily to FIG. 22, the meta-data structure for the loop component is hereinafter described in detail. The meta-data structure for the loop component comprises a name attribute 2201, a number of iterations attribute 2203 and a list of the variables in the process memory that can be potentially used as the value for the number of iterations attribute 2204, a reference to a rule or a decision tree (DT) 2205 if the exit condition is to be represented by a rule or a decision tree, and a selection button 2206 to select a rule or a decision tree. The application designer would specify a name for the loop and select one of the two exit conditions. If the number of iterations option 2203 is chosen, the application designer needs to select a variable from the list of variables 2204 in process memory. If the rule and/or decision tree option 2205 is chosen, the application designer can use the Select Rule/DT button 2206 to select a specific rule or decision tree.

4.6.2.6 Synchronization

Often in a process, tasks have precedence relationships with other tasks in the process, i.e., some tasks need to finish executing before other tasks may be executed. Since many tasks may be executed concurrently, the process execution will have to ensure that all precedence tasks are completed before executing the current task. While the Engine's execution flow naturally ensures that the precedence relationships are maintained, the synchronization component allows the application designer to model such synchronization explicitly.

Figure 23:
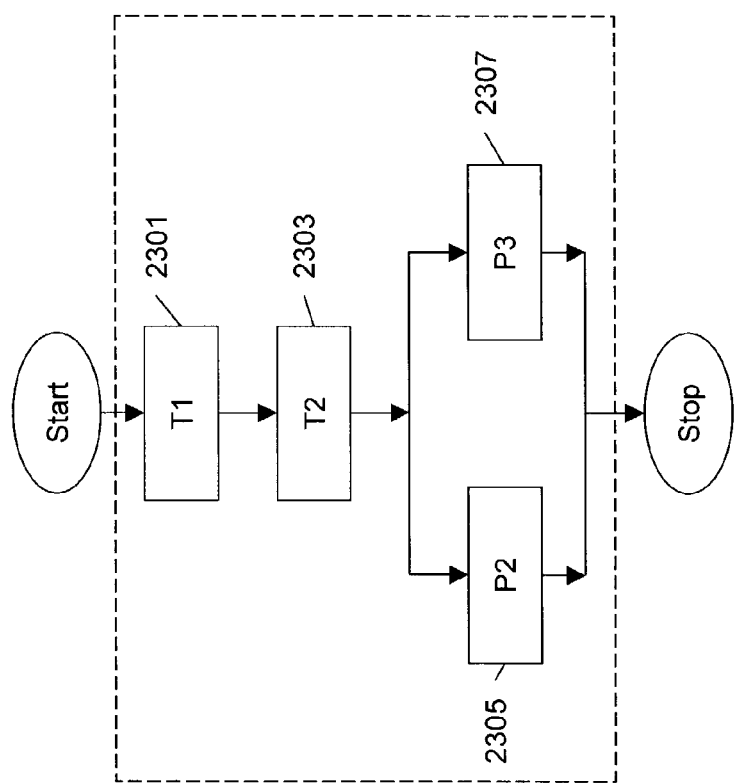
FIG. 23 illustrates a process having a mix of synchronous and asynchronous tasks.

Asynchronous execution of tasks is used within a process when there are two or more tasks or sub processes that need to run concurrently. Engine 717 shares the current process context with multiple threads. For example, consider the process P1 as illustrated in FIG. 23. The process P1 comprises two tasks: T1 and T2 and two child processes: P2 and P3. Processes P2 and P3 have been marked for asynchronous execution. Tasks T1 and T2 are executed sequentially at steps 2301 and 2303 respectively. After the execution of task T2, processes P2 and P3 are executed concurrently at steps 2305 and 2307. The system executes processes P2 and P3 concurrently by using two separate threads. The tasks within the processes P2 and P3 are then identified and executed. A process may consist of multiple sub-processes; each sub-process is capable of re-entry.

4.6.2.7 Annotation and Formatting

Annotation and formatting allow the application designer to address the documentation and look and feel aspects of the process model. Annotation allows the application designer to add explicit textual comments to make the process more readable. Formatting allows the application designer to control the appearance of the process including the ability to specify font, background and foreground color. Both annotation and formatting are relatively simple components that have no specific meta-data other than the contents of the annotation and formatting, respectively.

4.6.3 Functional Components 4.6.3.1 Process State

A Process State, for example Process State as set in steps 1208 and 1224, may be a user-defined state or a system-defined state. User defined states are externally monitored by the end user of the application. User-defined state is defined at process level. A system-defined state is also associated with the process level. The system-defined state has three possible values—"Start", "Processing" and "Complete". "Start" indicates that the process has been selected for execution, "Processing" indicates that the execution of the process is going on and "Complete" indicates that the processing is complete.

Figure 24:
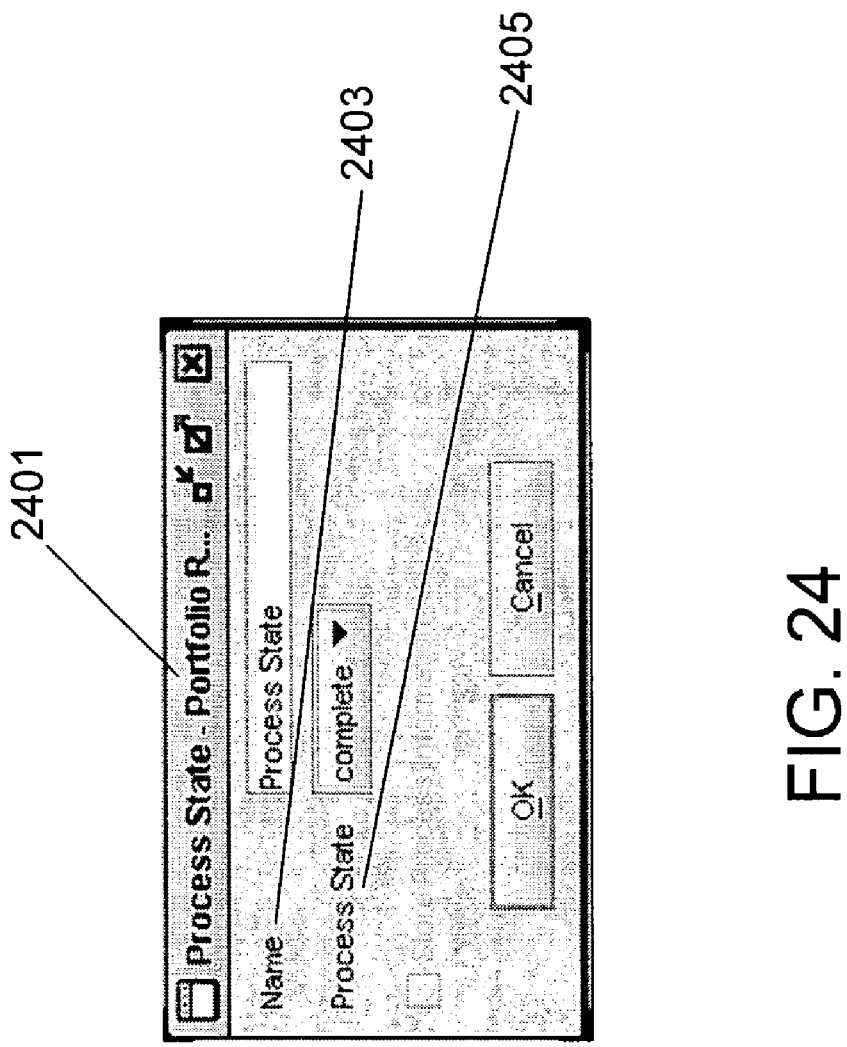
FIG. 24 illustrates the Process State component's meta-data structure.

Referring now primarily to FIG. 24, the Process State component's meta-data structure is hereinafter described in detail. The meta-data structure comprises an Identifier 2401 unique to the process, a Name 2403 and a Process State 2405 with multiple values.

4.6.3.2 Assignment

Frequently, in a process, the application designer needs to create new information as a function of existing information. This is done through a transformation or formula and the new information is stored in the process memory for subsequent operations. The Assignment component reflects an abstraction of such functionality so that the application designer can specify the information needed without any programming.

Figure 25:
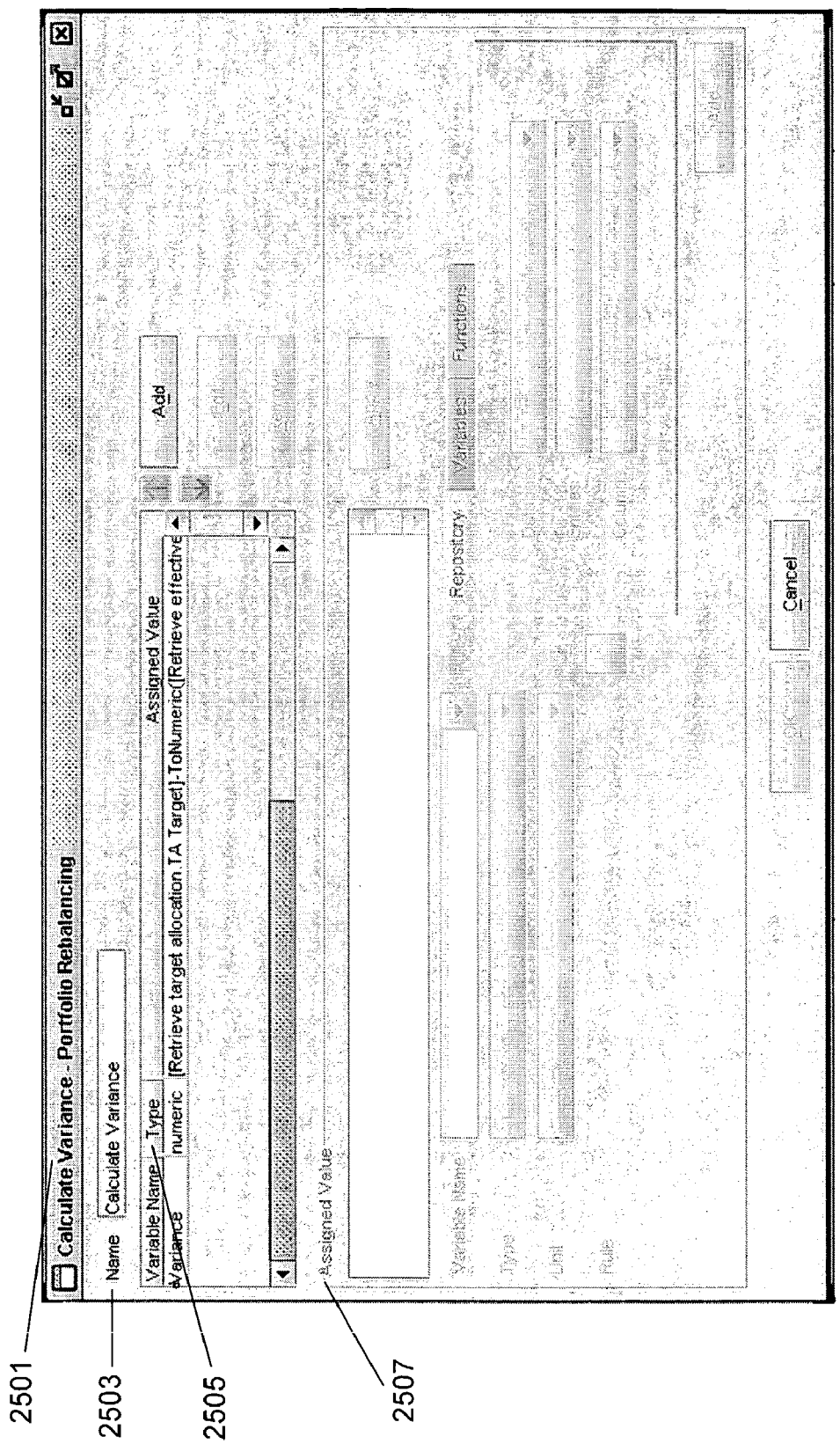
FIG. 25 illustrates the Assignment component's meta-data structure.

Referring now primarily to FIG. 25, the Assignment component's meta-data structure is hereinafter described in detail. The meta-data structure for an Assignment component comprises a unique Identifier 2501 for the Assignment component instance, a Name 2503, a Data Type 2505 and an Assigned Value 2507 (expression). As in the case of business rule, the meta-data structure allows the application designer to use any process memory information, information from the application database and/or built in functions to specify the assigned value.

Frequently, the application designer may need to create more than one variable. The meta-data structure allows the application designer to define multiple variable expressions in an assignment instance.

The corresponding assignment module in Engine 717 has the ability to execute the expressions defined in Assigned Value 2507 fields at runtime without the need to translate the defined expressions into code.

4.6.3.3 Database Access

Database Access component allows modeling of application data access through meta-data. This component performs the function of accessing data from databases. With reference to FIG. 6, the Database Access component is used to execute Validate Login task at step 605. To validate login, the system needs to match the password supplied by the user with the password stored in the database for that particular user ID. To match the passwords, the system accesses the password stored in database. To perform the database access function, Database Access component is used.

Figure 26:
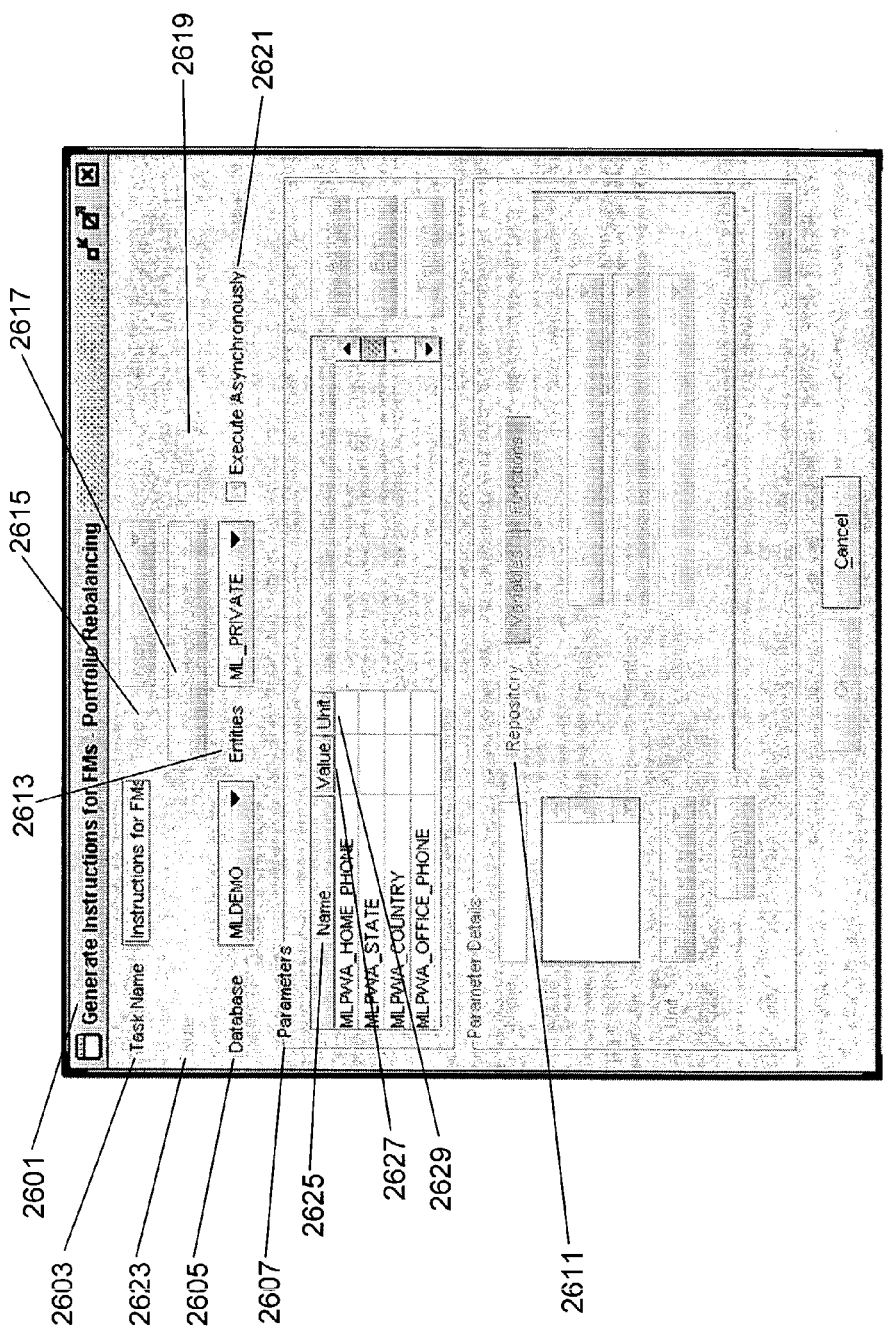
FIG. 26 illustrates the Database Access meta-data structure.

Referring now primarily to FIG. 26, the Database Access meta-data structure is hereinafter described in detail. The meta data structure for Database Access comprises a unique identifier 2601 for the database access component instance, a Name 2603, a Type 2615, a Rule 2623, a Bulk Selection Flag 2619, a Database 2605, a Entities 2613, an Asynchronous Execution Flag 2621, and a set of Parameters 2607, which in turn include the following attributes: a Name 2625, a Value 2627 and a Unit 2629. The application designer may specify the task to be of one of four types—Insert, Update, Delete and Select. Depending on the type of database access task specified and the entity value chosen, the application designer may then provide values for the fields in the chosen entity. While specifying the values, the application designer may use any process memory information, information from the application database and/or built-in functions. This is done using a parameter value definition tab 2611.

4.6.3.4 Business Rule

Business Rules component allows an application designer to model business rules as meta-data. The rules comprise one or more conditions that can be conjunctive or disjunctive. A rule is an Expression Evaluator that has RHS (Right Hand Side) related to LHS (Left Hand Side) expression. The outcomes of the rules are Boolean or literals. Similar to Expression Evaluator expression variables, these expressions may include literals, system functions, process variables and input parameters. Consider a Business Rule component's example as shown below:

```
If        (    customer. risk >    90
And            m1          >= 100000    )
Or        (    m2          <= 200000    )
Then      True
Else      False
          where, If, And, Or are associations
          (, ) are parentheses
          customer.risk, m1, m2 are the LHS expressions
          >, <=, >= are operators
          90, 100000 and 200000 are the RHS expressions
```

4.6.3.5 Decision Tree

Decision Tree component allows an application designer to model a decision tree as meta-data. At step 607, success of login is decided using a Decision Tree component. Three types of trees are supported by this component. The first type of the supported decision tree is a Sequential Tree, where all the decision rules are executed sequentially. The second type of the supported decision tree is a Binary Tree, where all the rules are executed one by one reflecting the way the rules are linked to the result of another rule. The third type of the supported decision tree is a Hybrid Tree where the rules are executed in a hybrid manner i.e. a combination of a Sequential Tree and a Binary Tree.

4.6.3.6 Model

Model component allows an application designer to model computational models as meta-data. Models may be any expression with no flow of control including memory variables, prior models and database references. Some additional attributes supported by this component are exception rules, filter rules, ranges, rounding, maximum value and minimum value. For instance, a Model component may be defined as shown below:

$$M=(a+5*b+customer.exposure)$$

where,
a=memory variable;
b=memory variable; and
customer.exposure=field in the application database This model is a function of two memory variables and a database field. The Expression Evaluator component evaluates this model and returns the result.

4.6.3.7 Connector Factory

Data Integration (DI) Module provides a connector factory to facilitate two-way information exchange with heterogeneous systems. The DI Module acts as an FTP client and implements the FTP library. When requested by Engine 717, the DI module may send or receive files from a remote system using a number of protocols such as FTP, SSH (Secure Shell), PGP (Pretty Good Privacy) or HTTP(S). The preferred embodiment is implemented using FTP, SSH and HTTP(S).

Figure 27:
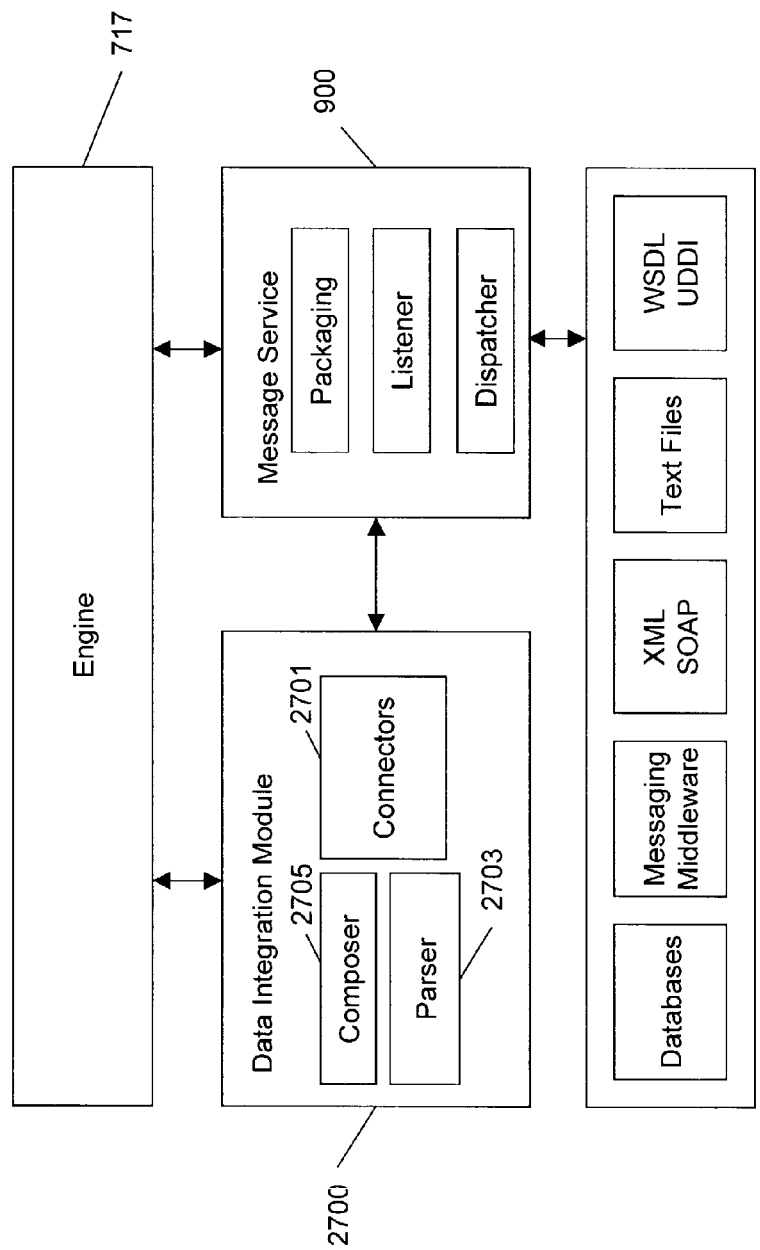
FIG. 27 shows the architecture of the Data Integration Module in association with the Engine and the Message Service.

Referring now primarily to FIG. 27, the architecture of DI Module in association with Engine 717 and Message Service 900 is hereinafter described in detail. A DI Module 2700 provides a pre-defined set of connectors 2701 to connect two heterogeneous systems for information exchange. It also provides a facility to create new connectors. Some examples of connectors are—Text file to Database, XML document to Database and Database to Database.

Engine 717 looks for incoming files (say text files) in an incoming directory. The file is written in the incoming directory by a target system. After the file is completely written into the incoming directory, Engine 717 schedules the corresponding integration process to run. This integration process executes the integration service. The integration process picks up the file from incoming directory. A Parser 2703 is used to parse the file based on a pre-defined format information associated with a connector. The integration process also applies validations to the file and reports any errors using error messages. Integration process also updates MyApp database 1507. DI Module 2700 also provides support to XML documents in a manner similar to Text files.

The message (for example error message) composition takes place within a Composer 2705 of DI Module 2700 in conjunction with Message Service 900. As discussed earlier, Message Service 900 performs the job of packaging and delivering messages using various protocols.

Database-to-Database connector makes the target database accessible. Database 721 is configured to access the target system database using middleware connectivity products such as Multiple Data Interface (MDI) gateways. The Database-to-Database connector stores mapping information to target system in layouts defined using Database 721.

The system in accordance with the preferred embodiment of the present invention has the capability of integrating with third party Web Services. DI Module 2700 has the capability of discovering, accessing and interfacing with external systems that provide Web Services. DI Module 2700 provides support for ebXML and SOAP.

4.6.3.8 Process

The Process component allows modeling of business processes as meta-data.

This component uses a visual flowchart metaphor to provide process modeling and representation. This component also invokes business tasks that form part of the process. Processes may be nested within other processes resulting in sub-processes. Processes as well as sub-processes are processes in themselves, thus the Process component will be used in both. In the example as illustrated in FIG. 6, the whole process is modeled using a Process component.

4.6.4 Third Party Component Integration

The system, in accordance with the preferred embodiment, has the capability to leverage components developed by third parties. For example, if a user has built a database-stored procedure, shell script or an executable program that may be used as a step in the business process, the preferred embodiment provides a mechanism to integrate it with System 700. The component that provides this mechanism is called an External component.

4.7 Desktop Integration Server

Figure 28:
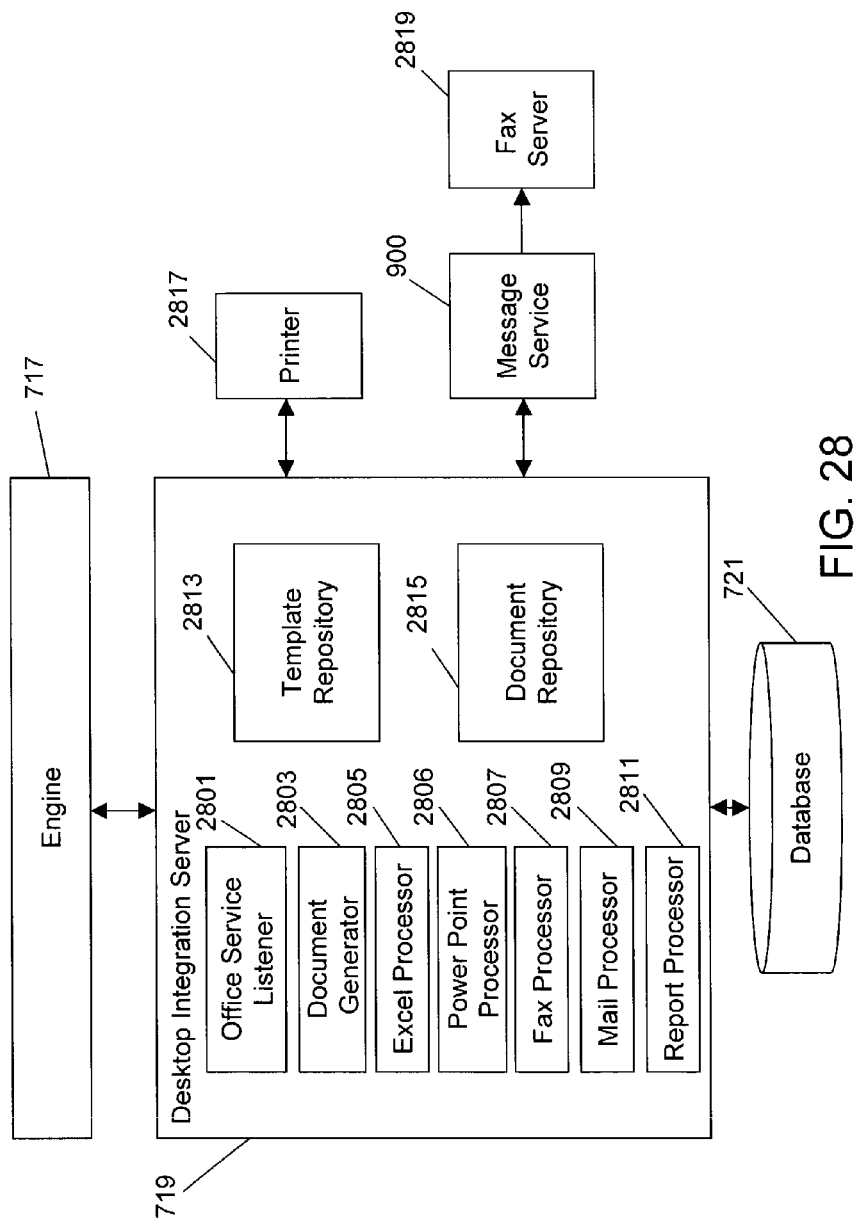
FIG. 28 shows the Desktop Integration Server and its connection with the Engine, the Message Service and the Database.

Referring now primarily to FIG. 28, the Desktop Integration Server and its connection with Engine 717, Message Service 900 and Database 721 is hereinafter described in detail. A Desktop Integration Server 719 comprises an Office Service Listener 2801 that checks if there are any requests from Engine 717 for Desktop Integration Server 719. Desktop Integration Server 719 also comprises a Document Generator 2803, an Excel Processor 2805, a Power Point Processor 2806, a Fax Processor 2807, a Mail Processor 2809 and a Report Processor 2811. Desktop Integration Server 719 also comprises a Template Repository 2813, which contains templates for creation of a word document, an Excel spreadsheet and a Power Point document. Desktop Integration Server 719 also comprises a Document Repository 2815.

In case there is a request for the generation of a word document, Desktop Integration Server 719 uses Document Generator 2803 to create the required document. In the preferred embodiment, Document Generator 2803 is an NT Service based on Microsoft® Word that enables the system to generate documents. Document Generator 2803 is a Java application, which may run on one or more servers. Every instance of Document Generator 2803 is capable of providing concurrent processing of requests. The server on which Document Generator 2803 runs also contains Template Repository 2813. Document Generator 2803 has a configuration file and a log file associated with it. The configuration file is used for saving user IDs and passwords in an encrypted form.

Engine 717 sends a request to Desktop Integration Server 719 if it comes across a Document Generator task. Engine 717 stores the current process status in Application Server 711 and updates the database with process and task status. Engine 717 sets the task to be performed after executing Document Generator task as a "restart" task. The execution of the process resumes from the "restart" task once the Office request gets completely processed. To process the Document Generator task, Engine 717 sends a request to Desktop Integration Server 719 through Message Service 900; the request gets added to the Office Request Queue. The request specifies parameters such as a Document Template Name, a Document Type and an Operation such as print, FAX and save. Document Generator 2803 listens to the requests from the Office Request Queue. On receiving a request, Document Generator 2803 starts executing the task corresponding to the request.

Figure 29:
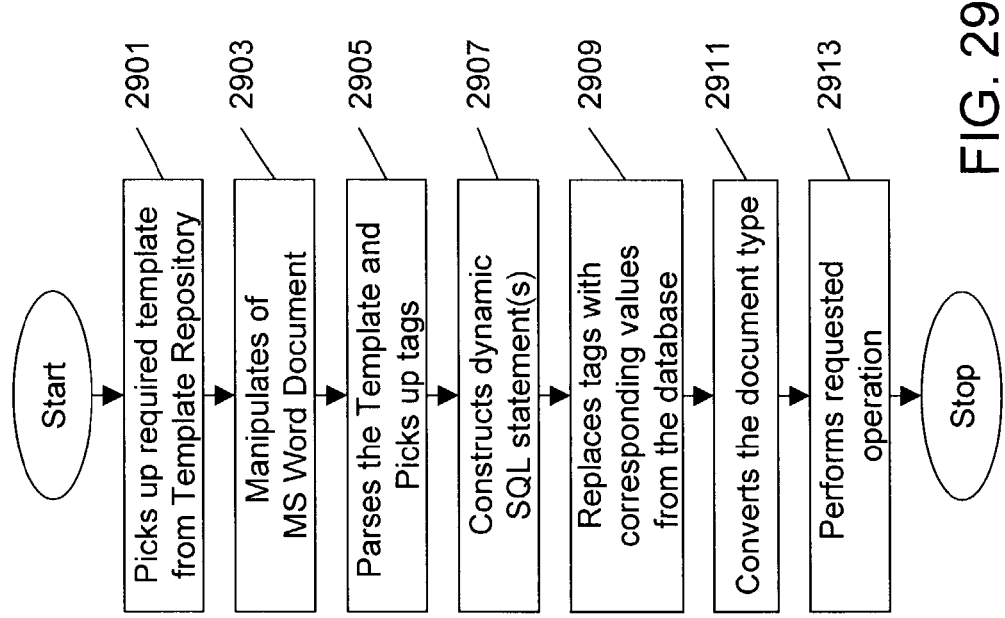
FIG. 29 illustrates a flowchart that shows the process of execution of a request by the Document Generator.

Referring primarily to FIG. 29, the manner in which Document Generator 2803 executes a request is hereinafter described in detail. Document Generator 2803 starts executing the job by picking the required template at step 2901 from Template Repository 2813. Document Generator 2803 then uses Jintegra's Java-COM bridge to manipulate the MS Word document at step 2903. At step 2905, Document Generator 2803 parses the template and picks up all the tags. The tags are special markers in the document that define the type of data to be inserted. Dynamic SQL (Structured Query Language) statements are then constructed by accessing Document Repository 2815 at step 2907. At step 2909, the values related to the tags are found from the application database and are placed in the document to create the document. The document is then converted to the required document type at step 2911. The document types supported in Desktop Integration Server 719 are DOC, RTF, XLS, PPT, XML and PDF. At step 2913, the requested operation is performed. The operation may be a print, a FAX or a save operation. If the requested operation is a print operation, the document is sent to a Printer 2817. If the requested operation is a FAX operation, the document is sent to a Fax Machine 2819 through Fax Processor 2807. If the requested operation is a save operation, the document is saved to a URL (Uniform Resource Locator) location and the URL is sent back to the process in Engine 717.

The result of the request from the process to Document Generator 2803 is written to the Result Queue. The result in the Result Queue may relate to status of the document generation request. The result may also contain the URL of the generated document. After the document generation request gets completed and all the results are written in the Office Response Queue, the original process request is set to 'START' so that the process execution may be resumed.

Desktop Integration Server 719 comprises Excel Processor 2805 that is used to generate Excel spreadsheets. Architecture of Excel Processor 2805 is very similar to that of Document Generator 2803. Excel Processor uses Template Repository 2813, which contains the templates for the generation of Excel spreadsheets. Excel Processor 2805 uses Excel ODBC (Open Database Connectivity) to generate Excel spreadsheets. The Excel spreadsheets created by Excel Processor 2805 may be printed, faxed or saved to the requested URL in a manner similar to a Microsoft® Word document.

Desktop Integration Server 719 also contains Power Point Processor 2806, which generates power point documents. Architecture of Power Point Processor 2806 is similar to that of Document Generator 2803. Power Point Processor 2806 uses Template Repository 2813 for generation of the power point documents. Power Point Processor 2806 uses COM+ (Component Object Model) to create the Power Point documents that contain texts and graphs.

Desktop Integration Server 719 also comprises Mail Processor 2809 that processes and sends mails to one or more recipients with the generated documents attached to it; Engine 717 acts as the mail client.

Desktop Integration Server 719 comprises Fax Processor 2807 that enables integration with Fax server 2819. Fax Processor 2807 commonly uses fax servers that are NT based and are compatible with RTF format. Hence, the documents are converted in RTF format before submitting a request to the Fax server.

4.8 Database

All the required information for the functioning of the system is stored in Database 721. Database 721 is a collection of resources such as databases, tables, columns and their extended attributes. Every component within Engine 717 is built on top of Database 721. Database 721 describes meta-data about meta-data. Designer 713 uses Database 721 to define and create objects from components.

Database 721 stores information related to Fields, Labels, Lists and Substitution Tables. Fields, Labels and Lists are used for creating GUIs. Labels are used for displaying some information to the users. Fields are used to hold information related to the display labels. Lists are used in GUI where the Item within a list box are subject to frequent changes. Lists are also used to hold meta-data that may change and the user needs to have an easy access to manage the contents of the list. Substitution Tables are generally used for Data Integration. DI Module 2700 uses these tables to perform either forward translation or reverse translation. This translation is required to ensure compatibility between data of external systems with that of System 700.

If a new data model or a set of new database objects such as tables and indices is created using any commercial Data Modeler tool, they could be accessed by System 700 once the changes are updated in Database 721, using the Update procedure. Similarly if a new XML schema needs to be accessed by System 700, the schema is created using a separate tool and the Update procedure is executed, so that System 700 begins to recognize the schema. The Update Procedure loops through all the database objects and stores their descriptions and attributes in Database 721. Once the objects are stored in Database 721, they are accessible to all the components.

4.9 Security

Figure 30:
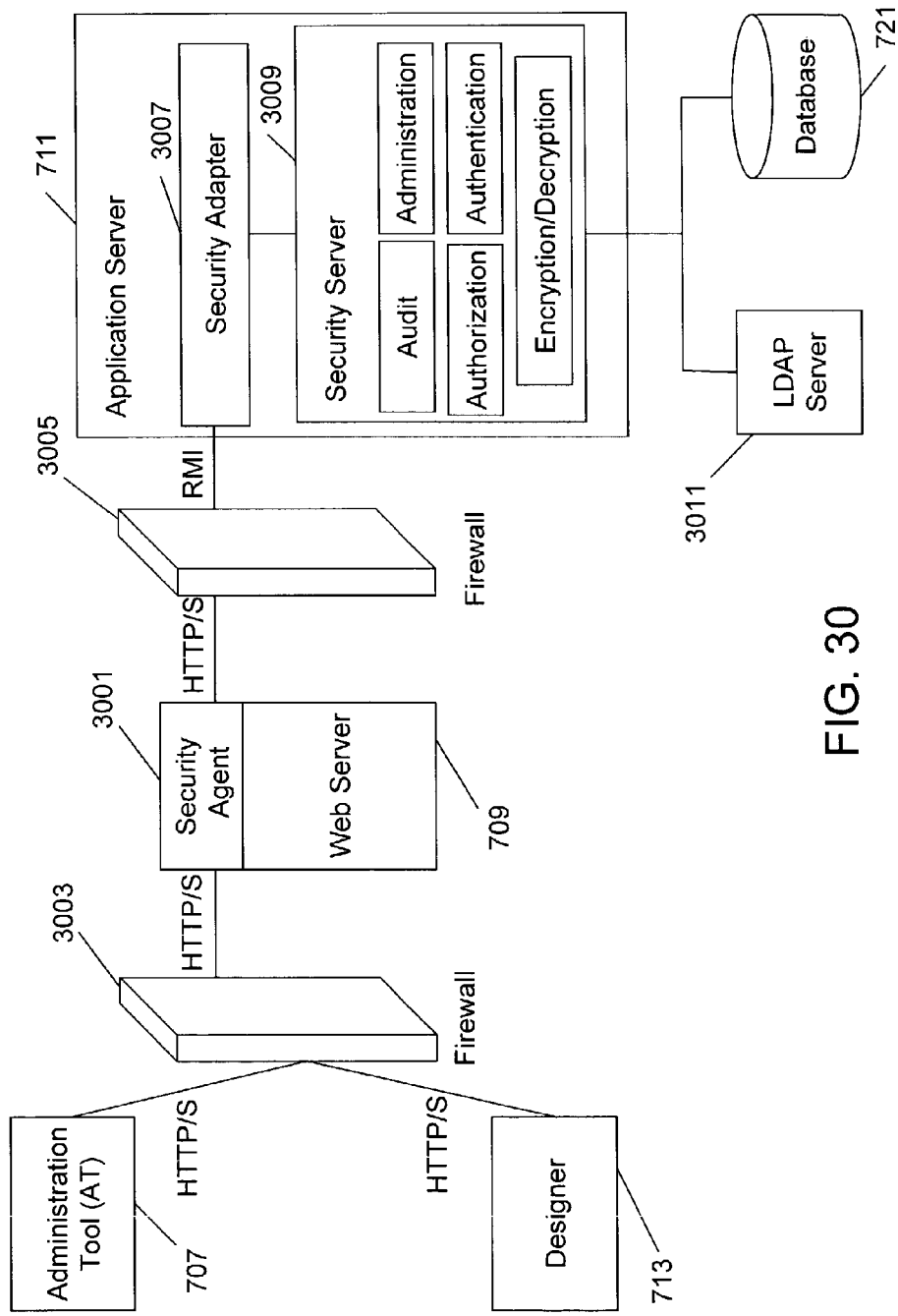
FIG. 30 shows the security framework supported by the system in accordance with the preferred embodiment of the present invention.

Application security is provided to achieve user and application integrity. Referring now primarily to FIG. 30, the security framework supported by System 700 is hereinafter described in detail. Requests from AT 707 and Designer 713 reach a Security Agent 3001 through a Firewall 3003. Firewall 3003, a part of Network security, protects the resources of the network from unauthorized people on other networks. Security Agent 3001 monitors the incoming HTTP requests and tracks the sessions. Security Agent 3001 provides page level access control and provides personalization of requests through the HTTP header. Security Agent 3001 is deployed on an HTTP Server. The authorized HTTP requests are sent to Application Server 711 through a Firewall 3005. Application Server 711 comprises a Security Adapter 3007 and a Security Server (SS) 3009. Security Adapter 3007 provides a defined set of interfaces to SS 3009. Security Adapter 3007 is used by the external applications that require to access the security services provided by SS 3009. Security Adapter 3007 is a bi-directional interface used to keep the user synchronization between System 700 and an external system like ERP or CRM SS 3009 has multiple security components, each providing a particular security service. The security components integrate with Database 721 or a LDAP (Lightweight Directory Access Protocol) Server 3011 for performing their respective functions. LDAP Server 3011 is used for locating resources in a network such as files and devices. The security services provided by the security components include Authentication, Authorization, Administration and Auditing.

The Authentication is the primary identity mechanism that is based on User ID and password. The Authentication is used to manage account of a user in System 700. The Authentication in System 700 provides facilities like changing the password. In the preferred embodiment, the Authentication is supported by an API based on XML. For third party applications, the API support for user management is provided through Web Server 709. Designer 713 directly talks to SS 3009 through HTTP(S). The Authentication service is accessible as a task, which in turn is accessible through a process. In other words, the Authentication service is provided as a task within a process.

The Authorization service controls the access of system resources based on the role of a user. The role of the user is generally based on the hierarchy within an enterprise. The Authorization service applies constraints on the access of the resources by a user on the basis of the user's role. The Access control includes functionality level access control and component instance level access control.

The Auditing service is used to track security events in System 700. The Auditing service provided in System 700 is file based. The architecture used for Auditing is the same as that used for Logging. Based on a configuration parameter, the audit log can be redirected to a different file, as the archival strategy may be different for the audit and the log file. SMTP messages are used to provide alert information regarding Critical Audit Events.

The Administration service relates to delegating user administration. The Administration service provides bi-directional synchronization of System 700 with external systems. Audit message management also takes place through the Administration service.

Consider an example wherein all the services provided by SS 3009 get used. When a user signs-in for the first time, a user profile is created for the user. The user profile may be created by an administrator or a process through an API call to Security Adapter 3007. The administrator or the process may call Security Adapter 3007 from within the process or by an external application. The administrator also creates roles and associates the users with the roles. The user submits his or her credentials in an encrypted channel to Web Server 709, using a 128-bit Server Digital Certificate. For every subsequent login of the user, a token is generated and attached to the user's browser, after authentication is successful. The token and the session information is encrypted and attached to every request. This information is attached in the HTTP header or the XML element for both the templates or dynamically generated pages. If a token is not found attached to a request, the user is redirected to the login screen. Security Agent 3001 looks for a token in the request when the user tries to access a resource. The resources can include a toolbar, a button menu, a menu-item or an edit box in Designer 713. The Authentication service accesses the user database, caches the user credentials and allows the user to access the protected resources.

AT 707 provides a GUI to define access control, group and user management. Database 721 stores the security rights by storing the list of users that do not have access to a resource. A list of users that do not have access rights for an object is stored as this list is likely to be shorter as compared to users with access rights. Some examples of groups for resource access are—Designer Group, AT Group and Applications Group. For example, an Application Group consists of a group of users that are provided with rights to use the application. The User Table keeps track of all the users of a particular application.

There may be a set of access rights associated with a resource. For example, a user may be provided with one or more of the following access rights—Full Access, Create, Read, Modify, Delete and Execute. The rights for a resource are defined at the time of creation of a new object. Default rights for a new object provide Full Access to the creator and Read and Execute rights to every other user. In the case of an application, access rights at the parent level may override access rights at the child level. For example, a user having Execute rights for a process may execute every object referred by the process irrespective of whether Execute rights for the object is provided to the user or not. If the administrator makes a user inactive, the information in the user cache, the session cache and the user authorization cache is deleted and the user is denied any further operation.

4.10 Additional Features 4.10.1 Internationalization

The system supports internationalization and thus may be used in any part of the world. All the software components of the overall system are completely internationalized and capable of localization to any language, including multi-byte character systems (MBCS). All the messages and the GUI labels such as menu and control labels are also internationalized. Based on the user's locale, the corresponding resource bundle is bound to the client. The applications generated using System 700 are also internationalized. All the date-times are stored in Universal Time format and appropriate conversions are made before showing it to the user.

The servers in the system operate on English Sun Solaris. The clients run on US English or the International version of Windows. The database and XML use UTF-8 (Unicode Transformation Format-8) encoding.

The language of the Oracle database may be set to the required language according to the user's preference. Language in the database is set by using NLS_LANG. The default value of NSL_LANG is AMERICAN_AMERICA.UTF8. The character set encoding is set to UTF-8 in INIT.ORA startup file for Oracle. The default LANG environmental variable for the operating system is en_US. The LC_ALL category is selected so that character handling, monetary formatting, date-time format and sorting rules depend on the selected locale.

Engine 717 stores messages in log or audit files in System 700 based on server locale. All the messages that are written to the log file are picked up from the resource bundle based on language ID. The system is made MBCS (Multibyte Character Set) aware. MBCS is used for character sets that contain large number of different characters, for example the Asian language character sets. The system supports the conversion of UCS-2 (Unicode Character Set-2) data to MBCS data and vice versa as per the requirement.

Designer 713 uses the system locale for the language, the date and the currency to drive UI.

AT 707 uses Xerces that supports UTF-8 for providing internationalization. AT 707 uses HTML templates and JSPs that are stored in a root directory. AT 707 supports multiple languages by placing a different template for each language in a sub-directory. The name of the sub-directory is driven by the system locale.

4.10.2 Dates and Times

All the server clocks run on local time of the locale in which the servers are located. This provides the flexibility of providing different values for time when the same record is viewed at the same instant from different time zones. Server local time, in the form of Coordinated Universal Time (UTC) offset +/−nnnn, is used while generating all the timestamps such as the transactions, the logs and the audit trails. End-user-visible timestamp shown to the user provides the time based on the locale time corresponding to the client. The system APIs have the local time and the UTC offset in XML API Header. When a user changes his or her locale, (for example when a user is traveling between two different time zones), the user would see different values for the same timestamp. The system also provides the facility that the transactions entered at different time zones are shown to the user with the timestamps in their local time. Thus, the timestamps are not shown in local time from where the transactions are initiated. If the user directly views the log files, all the timestamps are generated in server's locale time. This is explained using the following example:

A user in Boston enters transaction at 0830 EDT (i.e. UTC offset—0400).
A Server In CA stores timestamp at 0530 PDT (i.e. UTC offset—0700).
The user in Boston later looks at the transaction at 0830 EDT assuming the profile's time zone remains unchanged.
Another user in Chicago looks at the transaction at 0730 CDT.
The log entry visible to the administrator is 0530 PDT (time logged) submit timestamp=0530 PDT.

4.10.3 Import and Export

All the instances of the components provide an easy mechanism of importing or exporting to the XML format. This feature helps in easily moving the instances of the components or the entire application itself, from one physical server to another and also facilitates release engineering processes. Before performing an Import, the Referential Integrity tool helps in making sure that the integrity of the system is maintained.

The system supports import and export of any object such as an application, a process and a rule. Every object selected for export is translated to the XML format. If an application is selected for export, all the objects of every component type that are referred to in the application are also exported. For example, if a Decision Tree is chosen to be exported, all the Rules referred to in the particular Decision Tree are also exported. The system also supports export of Objects chosen from the Object Browser.

4.10.4 Object Differentiation Tool

The Object Differentiation Tool is used to compare two objects of similar type or two objects of the same component type. The Object Differentiation Tool is primarily used for designing new objects or for release management. For example, a user may use the Object Differentiation Tool while modifying and improving upon a template process. While modifying a template process, the user may come up with several versions of the template process. The user makes use of the Object Differentiation Tool when he needs to compare the two versions of the process to apply the changes. The comparison of the two objects may also be used to analyze the objects to understand the dependency with other dependent objects. Every object in the system has an XML representation, thus a graphical XML Differentiation Tool is used to easily summarize the differences between the two versions of the same object or the two objects of the same component type.

4.10.5 Cross Referencing Tool

The Cross Referencing Tool is used for maintaining integrity of the entire system. The system facilitates a high degree of re-usability of the objects. Many processes may share these objects concurrently. Thus, a user should not perform any action on an object that may create implications for other processes that use the same object. For example, a rule may be used across many processes for various purposes. If a user deletes or changes a shared rule, the implications affect the integrity of the system. To protect the integrity, the user's action needs to be validated first. The Cross Referencing Tool is used for making a user aware of all the other processes that are using the same object. The user may select an object of any type and invoke the Cross Referencing Tool. The Cross Referencing Tool summarizes all the references to the selected object with the relevant context in an explorer like tree control. The user may open and look at any of the references from the summary screen. The Cross Referencing Tool is thus used to make the user aware of all the other processes that are using the particular object and to protect the integrity of the system.

4.10.6 Version Management

System 700 provides a version management system that enables a user to store various versions of the instances of the components created within System 700. It lets a user view the version history and also view a specific version. It allows the user to restore the earlier versions as well. The application tracks the versions of all the components contained in the application. Only the versioned components (or applications) may be deployed. When another user makes a copy of a component by using Save As, Copy/Paste or Drag and Drop option, the user always gets access to the last versioned copy of the component. Also, the user is provided with a facility to reference the last versioned component instance. Engine 717 facilitates the execution of multiple versions of the same application at the same time.

4.10.7 Scaling Options

System 700 is scalable and may be deployed as a large enterprise, a workgroup or a departmental solution. The preferred embodiment is scalable at both the system as well as the application level. At the system level, the three layers—Presentation Layer 701, Service Layer 703 and Data Layer 705—may be deployed on a single server or may be spread over multiple servers. Every layer may further be deployed on one or more servers. If multiple servers are used, industry standard load balancing and fail-over solutions such as F5 and Cisco may be used. Engine 717 may also be deployed on multiple servers. Load balancing and fail-over solutions from J2EE are used while deploying Engine 717 on multiple servers. In the database server, high availability is achieved by using options such as Veritas Clustering and Oracle Parallel Server.

At the application level, various scaling solutions are available with System 700. Throughput and responsiveness of System 700 may be improved by increasing the number of concurrent process execution tasks. Engine 717 adapts to available resources such as CPU and memory. In other words, Engine 717 scales itself linearly with available resources. Thus, increasing resources on a single server or adding multiple servers improves the performance of System 700.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system including one or more central processing units (CPUs) for developing and executing a business application without programming and without generating code for any business domain using a visual modeling environment, the business application being developed with a reduced software development life cycle, the system comprising:
   a. a designer, the designer enabling an application designer to develop the business application without programming, the business application being developed by modeling a plurality of business processes using the visual modeling environment, each of the plurality of business processes comprising a plurality of business tasks, each of the plurality of business tasks being modeled as a plurality of instances of a plurality of prebuilt and reusable abstract business components, the visual modeling environment being used to select the plurality of instances of abstract business components, each of the plurality of abstract business components being a highly abstract object performing a specific function in a generic manner, each of the plurality of abstract business components comprising a plurality of Graphical User Interface (GUI) objects encapsulating application specific parameters, the application specific parameters defining functionality of each of the plurality of abstract business components, the application specific parameters being added to each of the plurality of abstract business components using the plurality of GUI objects to model each of the plurality of business tasks, wherein the selected instances of abstract business components with business process specific run-time properties being connected in a logical order to model each of the plurality of business processes;
   b. a database, the database being used for storing each of the plurality of business processes as meta-data, one set of the meta-data allows the application designer to provide startup parameters to the plurality of business processes including a unique system-generated parameter identifier, a parameter name, a direction meta-data indicating an incoming or an outgoing parameter, a parameter type, a list meta-data implying the parameter may have any one of values specified in the list meta-data, and a default parameter value; and
   c. an engine, the engine executing each of the plurality of modeled business tasks associated with each of the plurality of business processes without generating code, the engine being used to concurrently interpret and execute a plurality of requests, the concurrent execution being performed on the plurality of instances of the plurality of abstract business components, the output of the engine being the execution of the business application,
      wherein the system for developing and executing a business application eliminates the need for a business application developer to have expertise in a formal computer programming language.

2. The system according to claim 1, wherein the engine comprises:
   a. a Message Queue, the Message Queue temporarily storing the plurality of requests for executing the business application, summary information for each of the plurality of business tasks and business processes corresponding to the business application, and results obtained by processing of the plurality of requests;
   b. a Cache Manager, the Cache Manager caching each of the plurality of business processes when each of the plurality of business processes are invoked for first time, and providing each of the plurality of stored business processes for further usage for the application designer;
   c. an Execution Module, the Execution Module processing the plurality of requests made by the application designer and users of the business application, wherein the Execution Module comprises:
      i. a component execution module, the component execution module corresponding to each of the plurality of abstract business components, the component execution module being knowledgeable about the functionality of the application specific parameters corresponding to each of the plurality of the abstract business components;
      ii. a standardized execution module, the standardized execution module accessing the meta-data from the database, the meta-data being a collection of the application specific parameters associated with each of the plurality of abstract business components; and
      iii. a standardized messaging architecture, the standardized messaging architecture handling communication between a plurality of component execution modules; and
   d. an Exception Handling Framework, the Exception Handling Framework handling system errors and process-specific errors by using error types and error objects, the system errors occur during processing of the plurality of requests and the process-specific errors being stored as data for implementation by the application designer.

3. The system according to claim 1 further comprising:
   a. an Administration Tool, the Administration Tool enabling an administrator to perform administrative functions, the administrative functions comprising security management, log files maintenance, analyzing statistics related to each of the plurality of business processes and business tasks, and configuring settings of the engine;
   b. a Web Server, the Web Server running a Controller Servlet, the Controller Servlet being a program connecting the engine with the designer and the Administration Tool, and providing compatibility between the engine, the designer and the Administration Tool;
   c. a Designer Server, the Designer Server facilitating interfaces between the designer, the Administration Tool and the database; and
   d. a Desktop Integration Server, the Desktop Integration Server providing integration of the engine with a word processor, a spreadsheet, an email server, a fax server and a printer, the Desktop Integration Server comprising a document generator, the document generator generating documents as per the requirement of the engine.

4. The system according to claim 1 further comprising a version management system, the version management system enabling users to store, track and view history of various versions of each of the plurality of abstract business components.

5. The system according to claim 1, wherein the system enables the application designer to integrate a new component in the system, the new component is at least one of a shell script, an executable file, a database procedure, and an abstract business component.

6. The system according to claim 1, wherein the designer comprises a verifier, the verifier being used for testing, validating and debugging each of the plurality of modeled business processes using the visual modeling environment by applying a set of pre-defined verifications to each of the plurality of modeled business processes, the verifier enabling the application designer to step through each task in each of the plurality of business processes and verify each task, and to set breakpoints and watch variables for testing each of the plurality of business processes.

7. A method for developing and executing a business application without programming and without generating code for any business domain using a visual modeling environment, the business application is developed with a reduced software development life cycle, the method executed by a Central Processing Unit (CPU) comprising the steps of:
 a. identifying the business requirements of the business application as a plurality of business processes;
 b. enabling an application designer to develop the business application without programming, the business application being developed by modeling each of the plurality of business processes using the visual modeling environment, each of the plurality of business processes comprising a plurality of business tasks, each of the plurality of business tasks being modeled as a plurality of instances of a plurality of prebuilt and reusable abstract business components, the visual modeling environment being used to select the plurality of instances of abstract business components, each of the plurality of abstract business components being a highly abstract object performing a specific function in a generic manner, each of the plurality of abstract business components comprising a plurality of Graphical User Interface (GUI) objects encapsulating application specific parameters, the application specific parameters defining functionality of each of the plurality of abstract business components, the application specific parameters being added to each of the plurality of abstract business components using the plurality of GUI objects to model each of the plurality of business tasks, wherein the selected instances of abstract business components with business process specific run-time properties being connected in a logical order to model each of the plurality of business processes;
 c. storing each of the plurality of business processes as meta-data, one set of the meta-data allows the application designer to provide startup parameters to the plurality of business processes including a unique system-generated parameter identifier, a parameter name, a direction meta-data indicating an incoming or an outgoing parameter, a parameter type, a list meta-data implying the parameter may have any one of values specified in the list meta-data, and a default parameter value; and
 d. executing each of the plurality of modeled business tasks associated with each of the plurality of business processes by an engine without generating code to execute the business application, the engine performing concurrent interpretation, and execution of a plurality of requests, the concurrent execution being performed on the plurality of instances of the plurality of abstract business components,
  wherein the method for developing and executing a business application eliminates the need for a business application developer to have an expertise in a formal computer programming language.

8. The method according to claim 7 further comprising a method for enabling users to execute the business application, the method comprising the steps of:
 a. inputting a request to execute the business application by the users;
 b. identifying each of the plurality of business processes comprising each of the plurality of business tasks and the application specific parameters corresponding to the business application;
 c. caching each of the plurality of business processes related to the business application;
 d. executing each of the plurality of business processes and business tasks in the logical order as defined by the visual modeling environment;
 e. handling an error that occurs while processing the request, the error occurs in any of the above steps;
 f. logging information related to execution of each of the plurality of business tasks; and
 g. outputting results of the execution for further processing.

9. The method according to claim 7, wherein the method is carried out by a computer program.

10. The method according to claim 7 further comprising performing testing, validating and debugging of each of the plurality of modeled business processes using the visual modeling environment by applying a set of pre-defined verifications to each of the plurality of modeled business processes, and enabling the application designer to step through each task in each of the plurality of business processes and verify each task, and to set breakpoints and watch variables for testing each of the plurality of business processes.

11. The method according to claim 10 further comprising observing values of the watch variables while executing each of the plurality of modeled business processes and analyzing the information related to each of the plurality of modeled business processes at each of the breakpoints.

* * * * *